United States Patent
Kim et al.

(10) Patent No.: US 12,093,494 B2
(45) Date of Patent: Sep. 17, 2024

(54) TOUCH PANEL AND DISPLAY DEVICE INCLUDING THE SAME

(71) Applicant: LG Display Co., Ltd., Seoul (KR)

(72) Inventors: Jinseong Kim, Gimpo-si (KR); JuHan Kim, Bucheon-si (KR); Haewon Lee, Seoul (KR); MoonBae Gee, Paju-si (KR); Hyowon Kwon, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/988,516

(22) Filed: Nov. 16, 2022

(65) Prior Publication Data

US 2023/0214077 A1    Jul. 6, 2023

(30) Foreign Application Priority Data

Dec. 31, 2021 (KR) .................. 10-2021-0194526
Oct. 31, 2022 (KR) .................. 10-2022-0142765

(51) Int. Cl.
  *G06F 3/044* (2006.01)
(52) U.S. Cl.
  CPC .......... *G06F 3/0446* (2019.05); *G06F 3/0443* (2019.05); *G06F 3/0448* (2019.05)
(58) Field of Classification Search
  CPC .......... H01Q 1/14; H01Q 5/307; H01Q 1/243; H01Q 1/364; H01Q 1/38; H01Q 1/44; H01Q 5/40; G06F 3/041; G06F 3/0446; G06F 1/1626; G06F 1/1698; G06F 2203/04102; H01L 27/3225; H01L 27/323
  See application file for complete search history.

(56) References Cited

U.S. PATENT DOCUMENTS

| | | | |
|---|---|---|---|
| 9,631,171 B2 | 4/2017 | Soman et al. | |
| 2009/0317639 A1* | 12/2009 | Axisa | H05K 1/0283 |
| | | | 428/411.1 |
| 2016/0150641 A1 | 5/2016 | Yoo | |
| 2017/0005077 A1* | 1/2017 | Kim | H05K 1/0283 |
| 2017/0155084 A1 | 6/2017 | Park et al. | |
| 2018/0039361 A1 | 2/2018 | Choi | |
| 2019/0073057 A1* | 3/2019 | Ahn | G06F 3/0445 |
| 2019/0107911 A1* | 4/2019 | Zhai | H10K 59/40 |
| 2019/0189962 A1* | 6/2019 | Cho | H10K 50/86 |
| 2021/0111167 A1* | 4/2021 | Kang | H10K 77/111 |
| 2021/0249755 A1* | 8/2021 | Kim | H01Q 1/14 |
| 2022/0359404 A1* | 11/2022 | Sano | H01L 23/5386 |

FOREIGN PATENT DOCUMENTS

| | | | |
|---|---|---|---|
| KR | 101749861 B1 * | 6/2017 | |
| KR | 20190048959 A | 5/2019 | |
| KR | 20200111380 A | 9/2020 | |

* cited by examiner

*Primary Examiner* — Md Saiful A Siddiqui
(74) *Attorney, Agent, or Firm* — Seed IP Law Group LLP

(57) ABSTRACT

A display device according to an example embodiment of the present disclosure includes a touch pattern layer having a plurality of stretching patterns; and a touch electrode layer disposed on the touch pattern layer and having a plurality of touch electrodes, wherein each of the plurality of stretching patterns includes a plurality of unit patterns, wherein each of the plurality of touch electrodes includes a plurality of unit electrodes, wherein each of the plurality of unit patterns includes a first sub-unit pattern overlapping each of the plurality of unit electrode electrodes, and a second sub-unit pattern disposed inside the first sub-unit. Accordingly, laser lift off (LLO) process efficiency for the touch panel can be increased.

22 Claims, 32 Drawing Sheets

TOUCH PANEL AND DISPLAY DEVICE INCLUDING THE SAME

CROSS-REFERENCE TO RELATED APPLICATIONS

This application claims the benefit of and priority to Korean Patent Application No. 10-2021-0194526 filed on Dec. 31, 2021 and Korean Patent Application No. 10-2022-0142765 filed on Oct. 31, 2022, in the Republic of Korea, the entire contents of which are hereby expressly incorporated by reference into the present application.

BACKGROUND

Technical Field

The present disclosure relates to a touch panel and a display device including the same, and more particularly, to a stretchable touch panel and a display device including the same.

Description of the Related Art

Display devices used for a computer monitor, a TV, a mobile phone, and the like include an organic light emitting display (OLED) that emits light by itself, a liquid crystal display (LCD) that requires a separate light source, and the like.

Such display devices are being applied to more and more various fields including not only a computer monitor and a TV, but personal mobile devices, and thus, display devices having a reduced volume and weight while having a wide active area are being studied.

Recently, a display device that is manufactured to be stretchable in a specific direction and changeable into various shapes by forming a display unit, lines, and the like on a flexible substrate such as plastic that is a flexible material has received considerable attention as a next-generation display device.

BRIEF SUMMARY

An aspect of the present disclosure is to provide a touch panel including a stretchable touch electrode and a display device including the same.

Another aspect of the present disclosure is to provide a touch panel capable of achieving process stability and a display device including the same.

Technical benefits of the present disclosure are not limited to the above-mentioned benefits, and other benefits, which are not mentioned above, can be clearly understood by those skilled in the art from the following descriptions.

A display device according to an example embodiment of the present disclosure includes a touch pattern layer having a plurality of stretching patterns; and a touch electrode layer disposed on the touch pattern layer and having a plurality of touch electrodes, wherein each of the plurality of stretching patterns includes a plurality of unit patterns, wherein each of the plurality of touch electrodes includes a plurality of unit electrodes, wherein each of the plurality of unit patterns includes a first sub-unit pattern overlapping each of the plurality of unit electrode electrodes, and a second sub-unit pattern disposed inside the first sub-unit. Accordingly, laser lift off (LLO) process efficiency for the touch panel can be increased.

A display device according to another example embodiment of the present disclosure comprising a stretchable display panel and a stretchable touch panel, the touch panel includes a touch pattern layer having a plurality of stretching patterns; and a touch electrode layer disposed on the touch pattern layer and having a plurality of touch electrodes, wherein each of the plurality of stretching patterns includes a plurality of unit patterns, wherein each of the plurality of touch electrodes includes a plurality of unit electrodes, wherein each of the plurality of unit patterns includes a first sub-unit pattern overlapping each of the plurality of unit electrode electrodes, and a second sub-unit pattern disposed inside the first sub-unit.

Other matters of the example embodiments are included in the detailed description and the drawings.

According to the present disclosure, by disposing a touch pattern under a touch electrode, stretching reliability of a touch panel can be improved.

According to the present disclosure, by disposing an additional touch pattern, laser lift off (LLO) process efficiency for the touch panel can be increased.

The effects according to the present disclosure are not limited to the contents exemplified above, and more various effects are included in the present specification.

DETAILED DESCRIPTION

Figure 1:
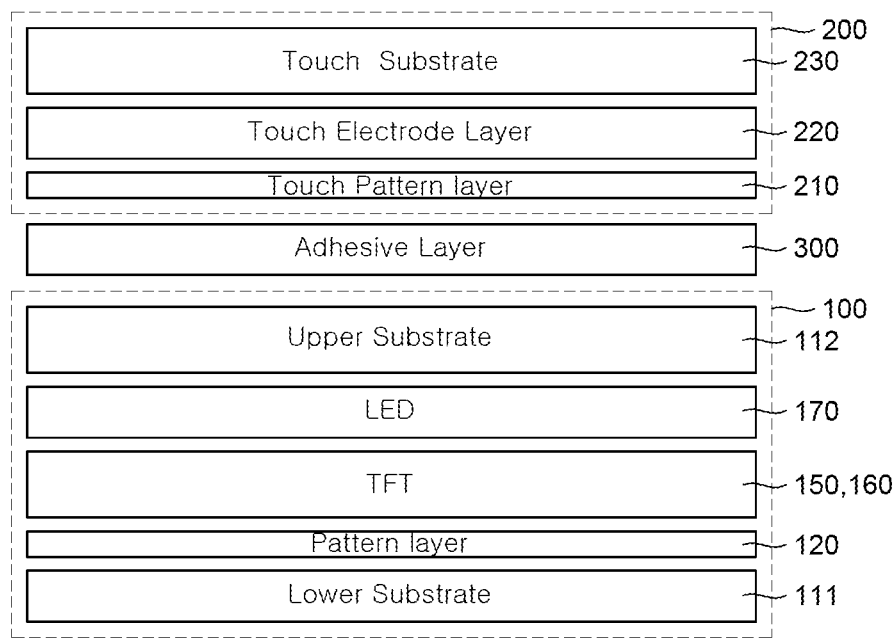
FIG. 1 is a cross-sectional view of a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are merely provided so that the disclosure of the present disclosure is complete, and to completely inform those of ordinary skill in the art.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

A display device according to an example embodiment of the present disclosure is a display device capable of displaying an image even if it is bent or stretched, and may also be referred to as a stretchable display device or a flexible display device. The display device may have higher flexibility and stretchability than conventional, typical display devices. Accordingly, a user can bend or stretch the display device, and a shape of the display device can be freely changed according to the user's manipulation. For example, when the user grabs and pulls an end of the display device, the display device may be stretched in a pulling direction by the user. If the user places the display device on an uneven outer surface, the display device can be disposed to be bent according to a shape of the outer surface. When force applied by the user is removed, the display device can return to an original shape thereof.

Stacked Structure of Touch Panel and Display Panel

FIG. 1 is a cross-sectional view of a display device according to an example embodiment of the present disclosure.

As illustrated in FIG. 1, a display device according to an example embodiment of the present disclosure may include a stretchable display panel 100, a stretchable touch panel 200, (hereinafter referred to as a touch panel 200) and an adhesive layer 300.

The display panel 100 may be stretchable and display an image. In addition, the display panel 100 may include a lower substrate 111, a pattern layer 120, a plurality of transistors 150 and 160, an LED 170, and an upper substrate 112 that are sequentially stacked. Accordingly, the LED 170 disposed above the pattern layer 120 is controlled by the plurality of transistors 150 and 160 to thereby display an image.

In addition, the touch panel 200 is disposed on the display panel 100, is stretchable, and may sense a touch. The touch panel 200 may include a touch pattern layer 210, a touch electrode layer 220, and a touch substrate 230 that are sequentially stacked.

Accordingly, a touch by a finger or a pen may be determined by detecting a change in mutual capacitance or self-capacitance between components of the touch electrode layer 220 disposed on the touch pattern layer 210.

In addition, the adhesive layer 300 serves to bond the display panel 100 and the touch panel 200. Accordingly, the adhesive layer 300 may be formed of an adhesive material disposed between the display panel 100 and the touch panel 200. Specifically, the adhesive layer 300 may be an optically clear adhesive (OCA), and may include an acrylic adhesive, a silicone adhesive, and a urethane adhesive.

As illustrated in FIG. 1, the touch panel 200 disposed on the display panel 100 is illustrated as an add-on type. However, the touch panel 200 may be disposed under the display panel 100 or may be disposed inside the display panel 100.

Hereinafter, the display panel of the display device according to an example embodiment of the present disclosure will be described in detail with reference to FIGS. 2 to 6.

Stretchable Substrate and Pattern Layer

Figure 2:
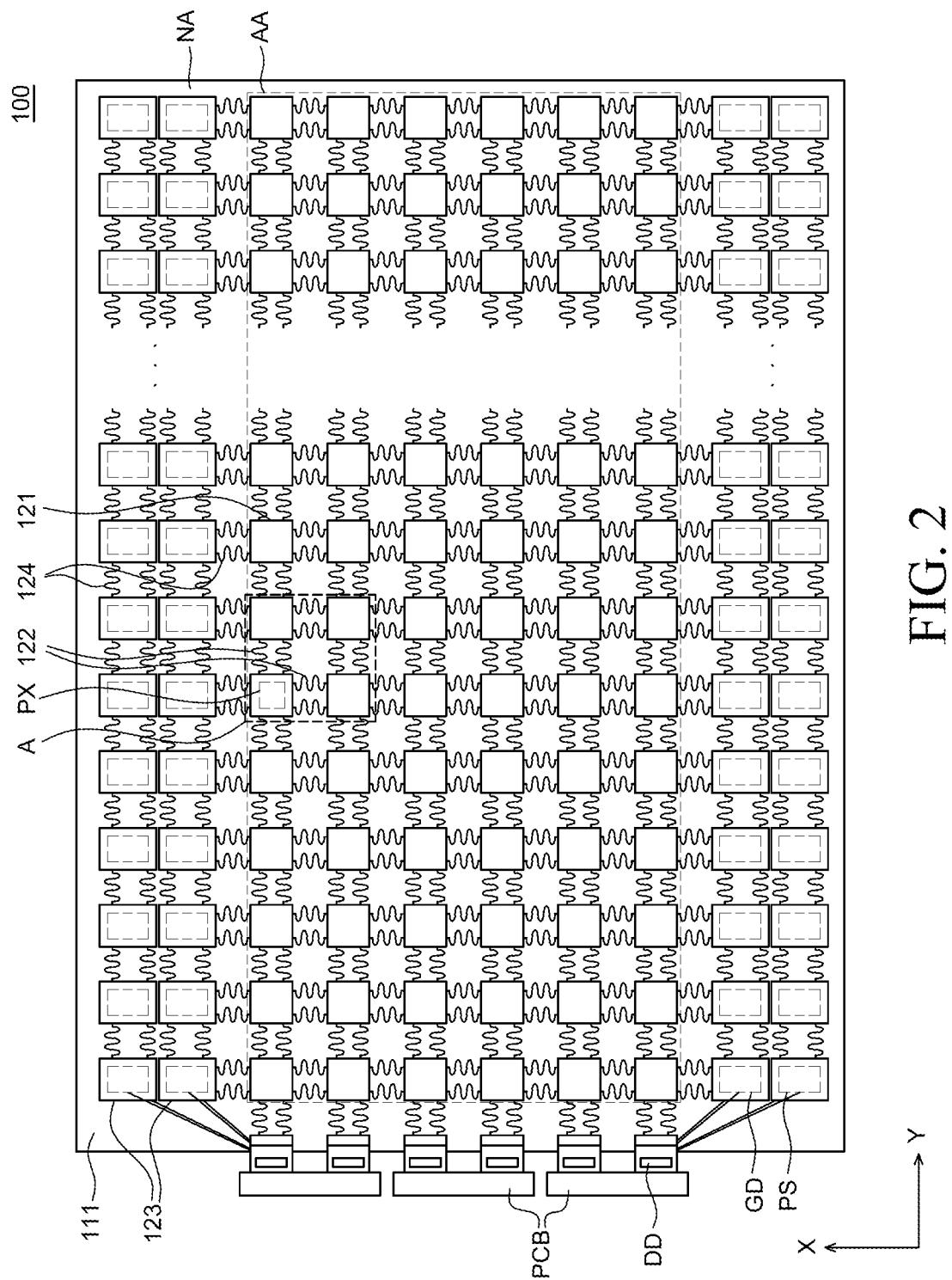
FIG. 2 is a plan view of a display panel of the display device according to an example embodiment of the present disclosure.

FIG. 2 is a plan view of a display panel of the display device according to an example embodiment of the present disclosure.

Figure 3:
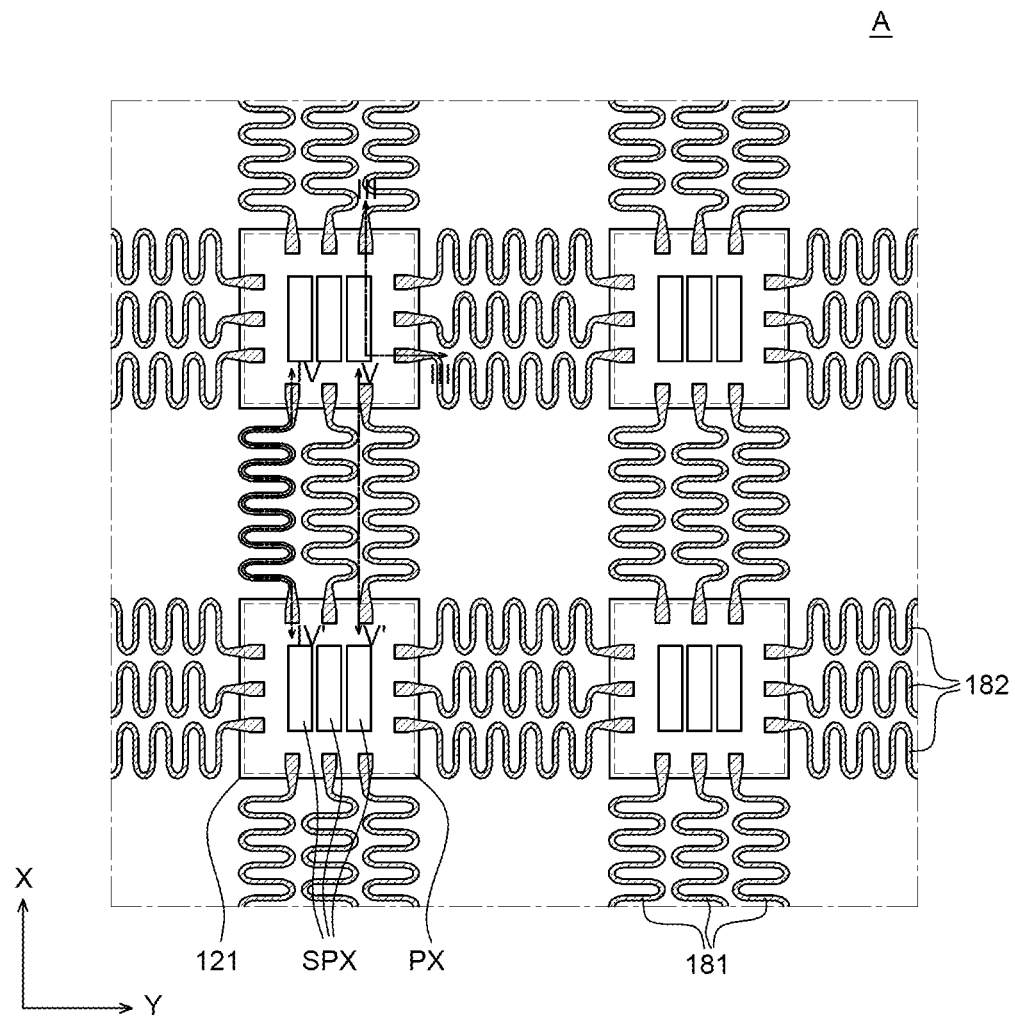
FIG. 3 is an enlarged plan view of area A illustrated in FIG. 2.

FIG. 3 is an enlarged plan view of area A illustrated in FIG. 2.

Figure 4:
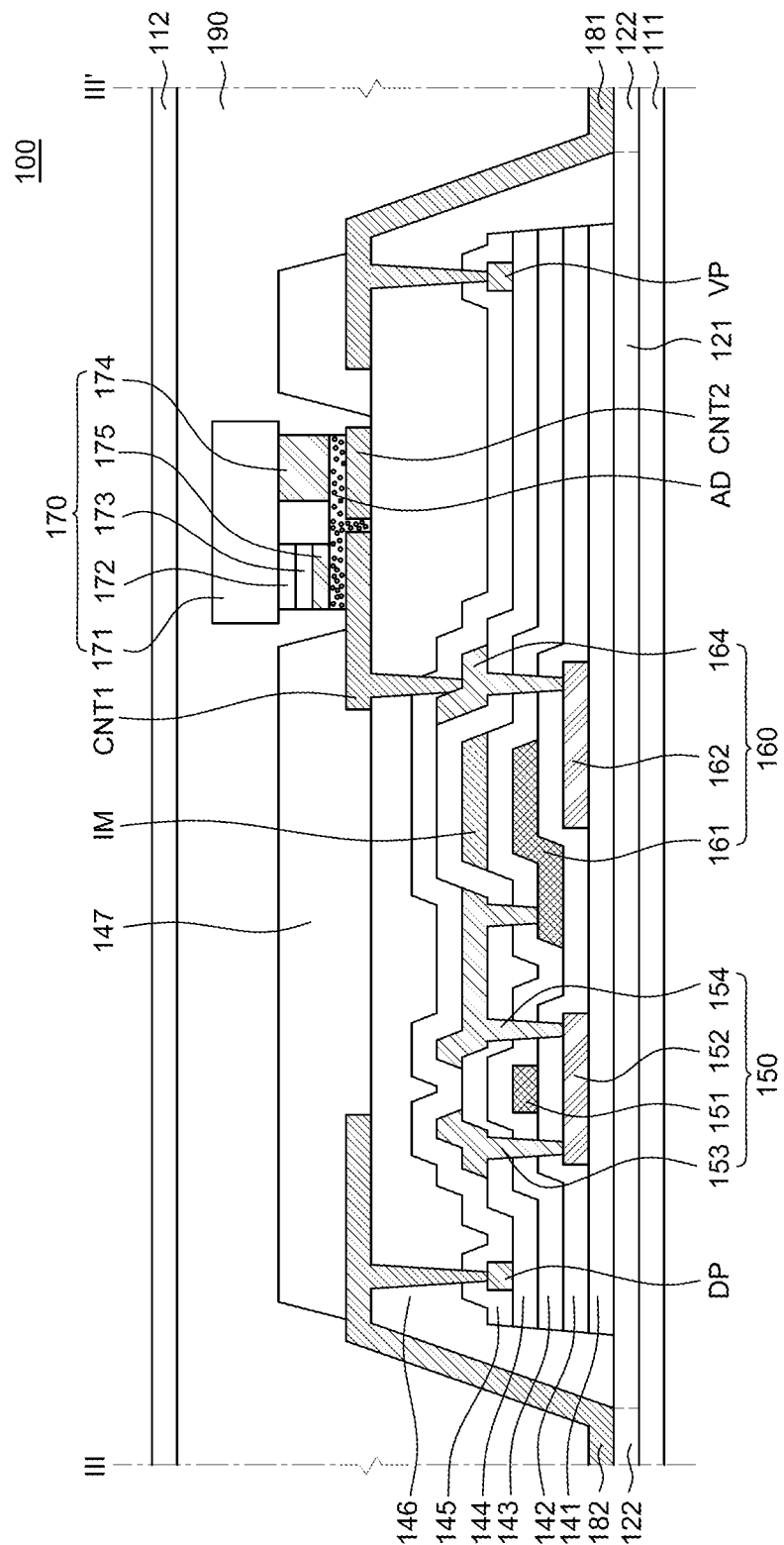
FIG. 4 is a cross-sectional view taken along cutting line III-III' illustrated in FIG. 3.

FIG. 4 is a cross-sectional view taken along cutting line III-III' illustrated in FIG. 3.

Referring to FIG. 2, the display panel 100 according to an example embodiment of the present disclosure may include the lower substrate 111, the pattern layer 120, a plurality of pixels PX, gate drivers GD, data drivers DD, and power supplies PS. And, referring to FIG. 2, the display panel 100 according to an example embodiment of the present disclosure may further include a first filling layer 190 and the upper substrate 112.

The lower substrate 111 is a substrate for supporting and protecting various components of the display panel 100. In addition, the upper substrate 112 is a substrate for covering and protecting various components of the display panel 100. That is, the lower substrate 111 is a substrate that supports the pattern layer 120 on which the pixels PX, the gate drivers GD, and the power supplies PS are formed. In addition, the upper substrate 112 is a substrate that covers the pixels PX, the gate drivers GD, and the power supplies PS.

Each of the lower substrate 111 and the upper substrate 112 is a ductile substrate and may be formed of an insulating material that can be bent or stretched. For example, each of the lower substrate 111 and the upper substrate 112 may be formed of silicone rubber such as polydimethylsiloxane (PDMS) or elastomers such as polyurethane (PU) and polytetrafluoroethylene (PTFE), and thus, may have flexible properties. In addition, materials of the lower substrate 111 and the upper substrate 112 may be the same, but are not limited thereto and may be variously modified.

Each of the lower substrate 111 and the upper substrate 112 is a ductile substrate and may be reversibly expandable and contractible. Accordingly, the lower substrate 111 may be referred to as a lower stretchable substrate, a lower flexible substrate, a lower extendable substrate, a lower ductile substrate, a first stretchable substrate, a first flexible substrate, a first extendable substrate, or a first ductile substrate, and the upper substrate 112 may be referred to as an upper stretchable substrate, an upper flexible substrate, an upper extendable substrate, an upper ductile substrate, a second stretchable substrate, a second flexible substrate, a second extendable substrate, or a second ductile substrate. Further, moduli of elasticity of the lower substrate 111 and the upper substrate 112 may be several MPa to several hundreds of MPa. Further, a ductile breaking rate of the lower substrate 111 and the upper substrate 112 may be 100% or higher. Here, the ductile breaking rate refers to a stretching rate at a time at which an object that is stretched is broken or cracked. A thickness of the lower substrate may be 10 μm to 1 mm, but is not limited thereto. Here, the ductile breaking rate refers to an extension distance when an object to be stretched is broken or cracked. That is, the ductile breaking rate is defined as a percentage ratio of a length of an original object and a length of the stretched object when an object has been stretched sufficiently that it is considered broken. For example, if a length of an object (e.g., substrate) is 100 cm when the object is not stretched and then, it reaches a length of 110 cm when the object has been stretched enough that it becomes broken or cracked at this length, then it was been stretched to 110% of its original length. In this case, the ductile breaking rate of the object is 110%. The number could thus also be called a ductile breaking ratio since it is a ratio of the stretched length as the numerator compared to the original upstretched length as the denominator at the time the break occurs.

The lower substrate 111 may have an active area AA and a non-active area NA surrounding the active area AA. However, the active area AA and the non-active area NA are not limited to the lower substrate 111 and may be referred throughout the display device.

The active area AA is an area in which an image is displayed on the display panel 100. The plurality of pixels PX are disposed in the active area AA. In addition, each of the pixels PX may include a display element and various driving elements for driving the display element. The various driving elements may mean at least one thin film transistor TFT and a capacitor, but are not limited thereto. In addition, each of the plurality of pixels PX may be connected to various lines. For example, each of the plurality of pixels PX may be connected to various lines such as gate lines, data lines, high potential voltage lines, low potential voltage lines, reference voltage lines and initialization voltage lines.

The non-active area NA is an area in which an image is not displayed. The non-active area NA may be disposed adjacent to the active area AA. For example, the non-active area NA may be an area that surrounds the active area AA. However, the present disclosure is not limited thereto, and the non-active area NA corresponds to an area of the lower substrate 111 excluding the active area AA and may be changed and separated into various shapes. Components for driving the plurality of pixels PX disposed in the active area AA are disposed in the non-active area NA. The gate drivers GD and power supplies PS may be disposed in the non-active area NA. In addition, a plurality of pads that are connected to the gate drivers GD and the data drivers DD may be disposed in the non-active area NA, and each of the pads may be connected to each of the plurality of pixels PX in the active area AA.

On the lower substrate 111, the pattern layer 120 including a plurality of first plate patterns 121 and a plurality of first line patterns 122 that are disposed in the active area AA and a plurality of second plate patterns 123 and a plurality of second line patterns 124 that are disposed in the non-active area NA is disposed.

The plurality of first plate patterns 121 may be disposed in the active area AA of the lower substrate 111. The plurality of pixels PX may be formed on the plurality of first plate patterns 121. In addition, the plurality of second plate patterns 123 may be disposed in the non-active area NA of the lower substrate 111. In addition, the gate drivers GD and the power supplies PS may be formed on the plurality of second plate patterns 123.

The plurality of first plate patterns 121 and the plurality of second plate patterns 123 as described above may be disposed in the form of islands that are spaced apart from each other. Each of the plurality of first plate patterns 121 and the plurality of second plate patterns 123 may be individually separated. Accordingly, the plurality of first plate patterns 121 and the plurality of second plate patterns 123 may be referred to as first island patterns and second island patterns, or first individual patterns and second individual patterns.

Specifically, the gate drivers GD may be mounted on the plurality of second plate patterns 123. The gate driver GD may be formed on the second plate pattern 123 in a gate in panel (GIP) method when various components on the first plate pattern 121 are manufactured. Accordingly, various circuit components constituting the gate drivers GD such as various transistors, capacitors, and lines may be disposed on the plurality of second plate patterns 123. However, the present disclosure is not limited thereto, and the gate driver GD may be mounted in a chip on film (COF) method.

In addition, the power supplies PS may be mounted on the plurality of second plate patterns 123. The power supply PS may be formed on the second plate pattern 123 with a plurality of power blocks that are patterned when various components on the first plate pattern 121 are manufactured. Accordingly, the power blocks disposed on different layers may be disposed on the second plate pattern 123. That is, a lower power block and an upper power block may be sequentially disposed on the second plate pattern 123. In addition, a low potential voltage may be applied to the lower power block, and a high potential voltage may be applied to the upper power block. Accordingly, the low potential voltage may be supplied to the plurality of pixels PX through the lower power block. In addition, the high potential voltage may be supplied to the plurality of pixels PX through the upper power block.

Referring to FIG. 2, sizes of the plurality of second plate patterns 123 may be greater than sizes of the plurality of first plate patterns 121. Specifically, the size of each of the plurality of second plate patterns 123 may be greater than the size of each of the plurality of first plate patterns 121. As described above, the gate driver GD may be disposed on each of the plurality of second plate patterns 123, and one stage of the gate driver GD may be disposed on each of the plurality of second plate patterns 123. Accordingly, since an area that is occupied by various circuit components constituting one stage of the gate driver GD is relatively greater than an area occupied by the pixels PX, the size of each of the plurality of second plate patterns 123 may be greater than the size of each of the first plate patterns 121.

In FIG. 2, the plurality of second plate patterns 123 are illustrated as being disposed on both sides in a first direction X in the non-active area NA, but the present disclosure is not limited thereto, and the plurality of second plate patterns 123 may be disposed in any area of the non-active area NA. In addition, although the plurality of first plate patterns 121 and the plurality of second plate patterns 123 are illustrated in a quadrangular shape, the present disclosure is not limited thereto, and the plurality of first plate patterns 121 and the plurality of second plate patterns 123 are changeable in various forms.

Referring to FIGS. 2 and 4, the pattern layer 120 may further include the plurality of first line patterns 122 disposed in the active area AA and the plurality of second line patterns 124 disposed in the non-active area NA.

The plurality of first line patterns 122 are patterns that are disposed in the active area AA and connect the first plate patterns 121 adjacent to each other. That is, the plurality of first line patterns 122 are disposed between the plurality of first plate patterns 121.

The plurality of second line patterns 124 may be patterns that are disposed in the non-active area NA and connect the first plate patterns 121 and the second plate patterns 123 adjacent to each other or the plurality of second plate patterns 123 adjacent to each other. That is, the plurality of second line patterns 124 may be disposed between the first plate patterns 121 and the second plate patterns 123 that are adjacent to each other. And, the plurality of second line patterns 124 may be disposed between the plurality of second plate patterns 123 that are adjacent to each other. Referring to FIG. 2, the plurality of first line patterns 122 and the plurality of second line patterns 124 have a wavy shape. For example, the plurality of first line patterns 122 and the plurality of second line patterns 124 may have a sine wave shape. However, the shapes of the plurality of first line patterns 122 and the plurality of second line patterns 124 are not limited thereto. For example, the plurality of first line patterns 122 and the plurality of second line patterns 124 may extend in a zigzag manner. Alternatively, shapes of the plurality of first line patterns 122 and the plurality of the second line patterns 124 may have various shapes, such as shapes in which a plurality of rhombus-shaped substrates are extended by being connected at vertices thereof. The numbers and shapes of the plurality of first line patterns 122 and the second line patterns 124 illustrated in FIG. 2 are example, and the numbers and shapes of the plurality of first line patterns 122 and the second line patterns 124 may be variously changed according to design.

In addition, the plurality of first plate patterns 121, the plurality of first line patterns 122, the plurality of second plate patterns 123, and the plurality of second line patterns 124 are rigid patterns. That is, the plurality of first plate patterns 121, the plurality of first line patterns 122, the plurality of second plate patterns 123, and the plurality of second line patterns 124 may be rigid compared to the lower substrate 111 and the upper substrate 112. Accordingly, moduli of elasticity of the plurality of first plate patterns 121, the plurality of first line patterns 122, the plurality of second plate patterns 123, and the plurality of second line patterns 124 may be higher than a modulus of elasticity of the lower substrate 111. The modulus of elasticity is a parameter representing a rate of deformation against a stress applied to the substrate. When the modulus of elasticity is relatively high, hardness may be relatively high. Accordingly, the plurality of first plate patterns 121, the plurality of first line patterns 122, the plurality of second plate patterns 123, and the plurality of second line patterns 124 may be referred to as a plurality of first rigid patterns, a plurality of second rigid patterns, a plurality of third rigid patterns, and a plurality of fourth rigid patterns, respectively. The moduli of elasticity of the plurality of first plate patterns 121, the plurality of first line patterns 122, the plurality of second plate patterns 123, and the plurality of second line patterns 124 may be 1000 times higher than the moduli of elasticity of the lower substrate 111 and the upper substrate 112, but the present disclosure is not limited thereto.

The plurality of first plate patterns 121, the plurality of first line patterns 122, the plurality of second plate patterns 123, and the plurality of second line patterns 124 that are a plurality of rigid substrates may be formed of a plastic material having flexibility that is lower than that of the lower substrate 111 and the upper substrate 112. For example, the plurality of first plate patterns 121, the plurality of first line patterns 122, the plurality of second plate patterns 123, and the plurality of second line patterns 124 may be formed of at least one material among polyimide (PI), polyacrylate or polyacetate. In this case, the plurality of first plate patterns 121, the plurality of first line patterns 122, the plurality of second plate patterns 123, and the plurality of second line patterns 124 may be formed of the same material, but they are not limited thereto and may be formed of different materials. When the plurality of first plate patterns 121, the plurality of first line patterns 122, the plurality of second plate patterns 123, and the plurality of second line patterns 124 are formed of the same material, they may be integrally formed.

In some embodiments, the lower substrate 111 may be defined as including a plurality of first lower patterns and a second lower pattern. The plurality of first lower patterns may be areas of the lower substrate 111 that overlap the plurality of first plate patterns 121 and the plurality of second plate patterns 123, and the second lower pattern may be an area that does not overlap the plurality of first plate patterns 121 and the plurality of second plate patterns 123.

Also, the upper substrate 112 may be defined as including a plurality of first upper patterns and a second upper pattern. The plurality of first upper patterns may be areas of the upper substrate 112 that overlap the plurality of first plate patterns 121 and the plurality of second plate patterns 123. The second upper pattern may be an area that does not overlap the plurality of first plate patterns 121 and the plurality of second plate patterns 123.

In this case, moduli of elasticity of the plurality of first lower patterns and first upper patterns may be higher than moduli of elasticity of the second lower patterns and the second upper patterns. For example, the plurality of first lower patterns and the first upper patterns may be formed of the same material as the plurality of first plate patterns 121 and the plurality of second plate patterns 123, and the second lower pattern and the second upper pattern may be formed of a material having a modulus of elasticity lower than those of the plurality of first plate patterns 121 and the plurality of second plate patterns 123.

That is, the first lower pattern and the first upper pattern may be formed of polyimide (PI), polyacrylate, polyacetate, or the like, and the second lower pattern and the second upper pattern may be formed of silicon rubber such as polydimethylsiloxane (PDMS) or elastomers such as polyurethane (PU), polytetrafluoroethylene (PTFE) and the like.

Non-Active Area Driving Element

The gate drivers GD are components which supply a gate voltage to the plurality of pixels PX disposed in the active area AA. The gate drivers GD include a plurality of stages formed on the plurality of second plate patterns 123 and respective stages of the gate drivers GD may be electrically connected to each other through a plurality of gate connection lines. Accordingly, a gate voltage output from any one of stages may be transmitted to another stage. Further, the respective stages may sequentially supply the gate voltage to the plurality of pixels PX connected to the respective stages.

The power supplies PS may be connected to the gate drivers GD and supply a gate driving voltage and a gate clock voltage. Further, the power supplies PS may be connected to the plurality of pixels PX and supply a pixel driving voltage to each of the plurality of pixels PX. The power supplies PS may also be formed on the plurality of second plate patterns 123. That is, the power supplies PS may be formed on the plurality of second plate patterns 123 to be adjacent to the gate drivers GD. Further, each of the power supplies PS formed on the plurality of second plate patterns 123 may be electrically connected to the gate driver GD and the plurality of pixels PX. That is, the plurality of power supplies PS formed on the plurality of second plate patterns 123 may be connected by a gate power supply connection line and a pixel power supply connection line.

Therefore, each of the plurality of power supplies PS may supply a gate driving voltage, a gate clock voltage, and a pixel driving voltage.

The printed circuit board PCB is a component which transmits signals and voltages for driving the display element from a control unit to the display element. Therefore, the printed circuit board PCB may also be referred to as a driving substrate. A control unit such as an IC chip or a circuit may be mounted on the printed circuit board PCB. Further, a memory, a processor or the like may be mounted on the printed circuit board PCB. Further, the printed circuit board PCB provided in the display panel 100 may include a stretchable area and a non-stretchable area to secure stretchability. Also, on the non-stretchable area, an IC chip, a circuit, a memory, a processor and the like may be mounted, and in the stretchable area, lines electrically connected to the IC chip, the circuit, the memory and the processor may be disposed.

The data driver DD is a component which supplies a data voltage to the plurality of pixels PX disposed in the active area AA. The data driver DD may be configured in a form of an IC chip and thus, may also be referred to as a data integrated circuit D-IC. Further, the data driver DD may be mounted on the non-stretchable area of the printed circuit board PCB. That is, the data driver DD may be mounted on the printed circuit board PCB in a form of a chip on board (COB). Although in FIG. 2, it is illustrated that the data driver DD is mounted in a chip on board (COB) manner, the present disclosure is not limited thereto and the data driver DD may be mounted in a chip on film (COF), a chip on glass (COG), a tape carrier package (TCP) manner, or the like.

Also, although it is illustrated in FIG. 2 that one data driver DD is disposed to correspond to a line of the first plate patterns 121 disposed in the active area AA, the present disclosure is not limited thereto. That is, one data driver DD may be disposed to correspond to a plurality of columns of the first plate patterns 121.

Figure 5:
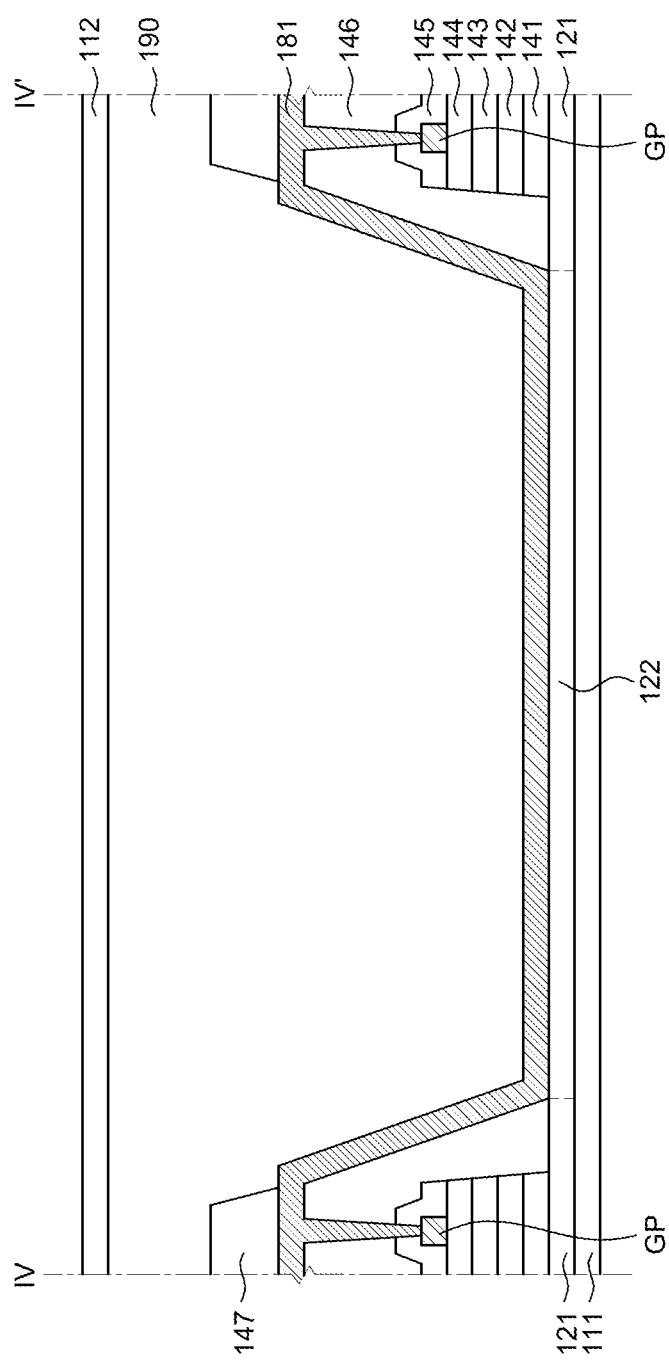
FIG. 5 is a cross-sectional view taken along cutting line IV-IV' illustrated in FIG. 3.
Figure 6:
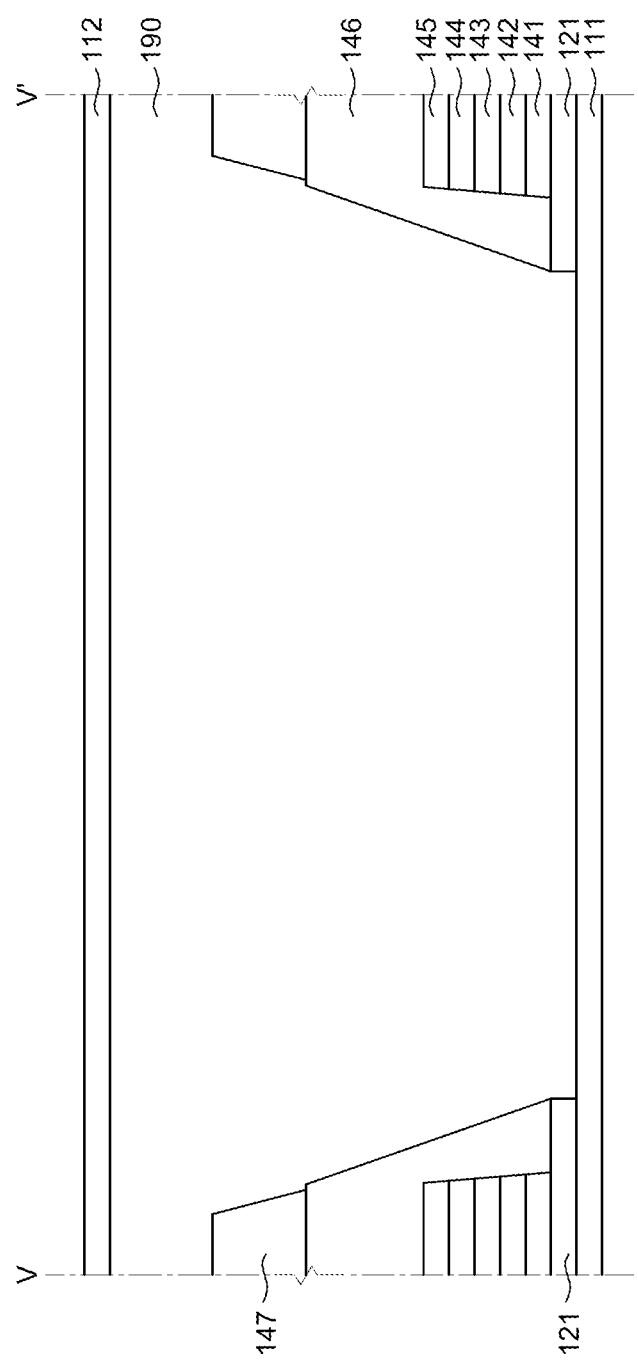
FIG. 6 is a cross-sectional view taken along cutting line V-V' illustrated in FIG. 3.

Hereinafter, FIGS. 5 and 6 are referred together for a more detailed description of the active area AA of the display panel 100 according to an example embodiment of the present disclosure.

Planar and Cross-Sectional Structures of Active Area

FIG. 5 is a cross-sectional view taken along cutting line IV-IV' illustrated in FIG. 3.

FIG. 6 is a cross-sectional view taken along cutting line V-V' illustrated in FIG. 3.

FIGS. 2 to 4 are referred together for convenience of explanation.

Referring to FIGS. 2 and 3, the plurality of first plate patterns 121 are disposed on the lower substrate 111 in the active area AA. The plurality of first plate patterns 121 are disposed to be spaced apart from each other on the lower substrate 111. For example, the plurality of first plate patterns 121 may be disposed in a matrix form on the lower substrate 111 as illustrated in FIG. 2, but are not limited thereto.

Referring to FIGS. 3 and 4, pixels PX including a plurality of sub-pixels SPX are disposed on the first plate pattern 121. Also, each of the sub-pixels SPX may include an LED 170, which is a display element and a driving transistor 160 and a switching transistor 150 for driving the LED 170. However, the display element in the sub-pixel SPX is not limited to the LED and may be an organic light emitting diode. Further, the plurality of sub-pixels SPX may include a red sub-pixel, a green sub-pixel, and a blue sub-pixel, but are not limited thereto. Colors of the plurality of sub-pixels SPX may be variously changed as needed.

The plurality of sub-pixels SPX may be connected to a plurality of connection lines 181 and 182. That is, the plurality of sub-pixels SPX may be electrically connected to the first connection lines 181 extended in the first direction X. Also, the plurality of sub-pixels SPX may be electrically connected to the second connection lines 182 extended in a second direction Y.

Hereinafter, a cross-sectional structure of the active area AA will be described in detail with reference to FIG. 4.

Referring to FIG. 4, a plurality of inorganic insulating layers are disposed on the plurality of first plate patterns 121. For example, the plurality of inorganic insulating layers may include the buffer layer 141, a gate insulating layer 142, a first interlayer insulating layer 143, a second interlayer insulating layer 144, and a passivation layer 145. However, the present disclosure is not limited thereto. Various inorganic insulating layers may be further disposed on the plurality of first plate patterns 121. One or more of the buffer layer 141, the gate insulating layer 142, the first interlayer insulating layer 143, the second interlayer insulating layer 144, and the passivation layer 145 which are inorganic insulating layers may be omitted.

Specifically, the buffer layer 141 is disposed on the plurality of first plate patterns 121. The buffer layer 141 is formed on the plurality of first plate patterns 121 to protect various components of the display panel 100 against permeation of moisture ($H_2O$), oxygen ($O_2$) or the like from the outside of the lower substrate 111 and the plurality of first plate patterns 121. The buffer layer 141 may be formed of an insulating material. For example, the buffer layer 141 may be formed as a single layer or multiple layers of silicon nitride (SiNx), silicon oxide (SiOx), silicon oxynitride (SiON), or the like. However, the buffer layer 141 may be omitted depending on a structure or characteristics of the display panel 100.

In this case, the buffer layer 141 may be formed only in an area where the lower substrate 111 overlaps the plurality of first plate patterns 121 and the plurality of second plate patterns 123. As described above, the buffer layer 141 may be formed of an inorganic material. Thus, the buffer layer 141 may be easily damaged, such as easily cracked, while the display panel 100 is stretched. Therefore, the buffer layer 141 may not be formed in areas between the plurality of first plate patterns 121 and the plurality of second plate patterns 123. The buffer layer 141 may be patterned into shapes of the plurality of first plate patterns 121 and the plurality of second plate patterns 123 and formed on upper portions of the plurality of first plate patterns 121 and the plurality of second plate patterns 123. Accordingly, in the display panel 100 according to an example embodiment of the present disclosure, the buffer layer 141 is formed only in the area where it overlaps the plurality of first plate patterns 121 and the plurality of second plate patterns 123 which are rigid substrates, so that damage to various components of the display panel 100 may be prevented even when the display panel 100 is deformed, such as bent or stretched.

Referring to FIG. 4, the switching transistor 150 including a gate electrode 151, an active layer 152, a source electrode 153 and a drain electrode 154, and the driving transistor 160 including a gate electrode 161, an active layer 162, a source electrode and a drain electrode 164 are formed on the buffer layer 141.

First, referring to FIG. 2, the active layer 152 of the switching transistor 150 and the active layer 162 of the driving transistor 160 are disposed on the buffer layer 141. For example, each of the active layer 152 of the switching transistor 150 and the active layer 162 of the driving transistor 160 may be formed of an oxide semiconductor. Alternatively, the active layer 152 of the switching transistor 150 and the active layer 162 of the driving transistor 160 may be formed of amorphous silicon (a-Si), polycrystalline silicon (poly-Si), an organic semiconductor or the like.

The gate insulating layer 142 is disposed on the active layer 152 of the switching transistor 150 and the active layer 162 of the driving transistor 160. The gate insulating layer 142 is configured to electrically insulate the gate electrode 151 of the switching transistor 150 from the active layer 152 of the switching transistor 150 and electrically insulate the gate electrode 161 of the driving transistor 160 from the active layer 162 of the driving transistor 160. Further, the gate insulating layer 142 may be formed of an insulating material. For example, the gate insulating layer 142 may be formed as a single layer of silicon nitride (SiNx) or silicon oxide (SiOx) or multiple layers of silicon nitride (SiNx) or silicon oxide (SiOx), but is not limited thereto.

The gate electrode 151 of the switching transistor 150 and the gate electrode 161 of the driving transistor 160 are disposed on the gate insulating layer 142. The gate electrode 151 of the switching transistor 150 and the gate electrode 161 of the driving transistor 160 are disposed to be spaced apart from each other on the gate insulating layer 142. Further, the gate electrode 151 of the switching transistor 150 overlaps the active layer 152 of the switching transistor 150, and the gate electrode 161 of the driving transistor 160 overlaps the active layer 162 of the driving transistor 160.

Each of the gate electrode 151 of the switching transistor 150 and the gate electrode 161 of the driving transistor 160 may be formed of any one of various metal materials, for example, molybdenum (Mo), aluminum (Al), chromium (Cr), gold (Au), titanium (Ti), nickel (Ni), neodymium (Nd) and copper (Cu), or an alloy of two or more of them, or multiple layers thereof, but the present disclosure is not limited thereto.

The first interlayer insulating layer 143 is disposed on the gate electrode 151 of the switching transistor 150 and the gate electrode 161 of the driving transistor 160. The first interlayer insulating layer 143 insulates the gate electrode 161 of the driving transistor 160 and the intermediate metal layer IM. The first interlayer insulating layer 143 may also be formed of an inorganic material like the buffer layer 141. For example, the first interlayer insulating layer 143 may be formed as a single layer of silicon nitride (SiNx) or silicon oxide (SiOx) or multiple layers of silicon nitride (SiNx) or silicon oxide (SiOx), but is not limited thereto.

The intermediate metal layer IM is disposed on the first interlayer insulating layer 143. Further, the intermediate metal layer IM overlaps the gate electrode 161 of the driving transistor 160. Thus, a storage capacitor is formed in an area where the intermediate metal layer IM overlaps the gate electrode 161 of the driving transistor 160. Specifically, the gate electrode 161 of the driving transistor 160, the first interlayer insulating layer 143 and the intermediate metal layer IM form the storage capacitor. However, a position of the intermediate metal layer IM is not limited thereto. The intermediate metal layer IM may overlap another electrode to form a storage capacitor in various ways.

The intermediate metal layer IM may be formed of any one of various metal materials, for example, molybdenum (Mo), aluminum (Al), chromium (Cr), gold (Au), titanium (Ti), nickel (Ni), neodymium (Nd) and copper (Cu), or an alloy of two or more of them, or multiple layers thereof, but the present disclosure is not limited thereto.

The second interlayer insulating layer 144 is disposed on the intermediate metal layer IM. The second interlayer insulating layer 144 insulates the gate electrode 151 of the switching transistor 150 and the source electrode 153 and the drain electrode 154 of the switching transistor 150. Also, the second interlayer insulating layer 144 insulates the intermediate metal layer IM and the source electrode and the drain electrode 164 of the driving transistor 160. The second interlayer insulating layer 144 may also be formed of an inorganic material like the buffer layer 141. For example, the first interlayer insulating layer 143 may be formed as a single layer of silicon nitride (SiNx) or silicon oxide (SiOx) or multiple layers of silicon nitride (SiNx) or silicon oxide (SiOx), but is not limited thereto.

The source electrode 153 and the drain electrode 154 of the switching transistor 150 are disposed on the second interlayer insulating layer 144. Also, the source electrode and the drain electrode 164 of the driving transistor 160 are disposed on the second interlayer insulating layer 144. The source electrode 153 and the drain electrode 154 of the switching transistor 150 are disposed to be spaced apart from each other on the same layer. Further, although FIG. 2 does not illustrate the source electrode of the driving transistor 160, the source electrode of the driving transistor 160 is also disposed to be spaced apart from the drain electrode 164 of the driving transistor 160 on the same layer. In the switching transistor 150, the source electrode 153 and the drain electrode 154 may be electrically connected to the active layer 152 to be in contact with the active layer 152. Also, in the driving transistor 160, the source electrode and the drain electrode 164 may be electrically connected to the active layer 162 to be in contact with the active layer 162. Further, the drain electrode 154 of the switching transistor 150 may be electrically connected to the gate electrode 161 of the driving transistor 160 to be in contact with the gate electrode 161 of the driving transistor 160 through a contact hole.

The source electrode 153 and the drain electrodes 154 and 164 may be formed of any one of various metal materials, for example, molybdenum (Mo), aluminum (Al), chromium (Cr), gold (Au), titanium (Ti), nickel (Ni), neodymium (Nd) and copper (Cu), or an alloy of two or more of them, or multiple layers thereof, but the present disclosure is not limited thereto.

Further, in the present disclosure, the driving transistor 160 has been described as having a coplanar structure, but various types of transistors having a staggered structure or the like may also be used. Also, in the present disclosure, the transistor may be formed not only in a top gate structure but also in a bottom gate structure.

A gate pad GP and a data pad DP may be disposed on the second interlayer insulating layer 144.

Specifically, referring to FIG. 5, the gate pad GP serves to transfer a gate voltage to the plurality of sub-pixels SPX. The gate pad GP is connected to the first connection line 181 through a contact hole. In addition, the gate voltage supplied from the first connection line 181 may be transferred from the gate pad GP to the gate electrode 151 of the switching transistor 150 through a line formed on the first plate pattern 121.

In addition, referring to FIG. 4, the data pad DP serves to transfer a data voltage to the plurality of sub-pixels SPX. The data pad DP is connected to the second connection line 182 through a contact hole. In addition, the data voltage supplied from the second connection line 182 may be transferred from the data pad DP to the source electrode 153 of the switching transistor 150 through a line formed on the first plate pattern 121.

And, referring to FIG. 4 a voltage pad VP is a pad for transferring a low potential voltage to the plurality of sub-pixels SPX. The voltage pad VP is connected to the first connection line 181 through the contact hole. In addition, the low potential voltage supplied from the first connection line 181 may be transferred from the voltage pad VP to an n-electrode 174 of the LED 170 through a second connection pad CNT2 formed on the first plate pattern 121.

The gate pad GP and the data pad DP may be formed of the same material as the source electrode 153 and the drain electrodes 154 and 164, but are not limited thereto.

Referring to FIG. 2 the passivation layer 145 is formed on the switching transistor 150 and the driving transistor 160. The passivation layer 145 covers the switching transistor 150 and the driving transistor 160 to protect the switching transistor 150 and the driving transistor 160 against permeation of moisture, oxygen, and the like. The passivation layer 145 may be formed of an inorganic material and formed as a single layer or a plurality of layers, but is not limited thereto.

Also, the gate insulating layer 142, the first interlayer insulating layer 143, the second interlayer insulating layer 144 and the passivation layer 145 may be formed only in an area where they overlap the plurality of first plate patterns 121. The gate insulating layer 142, the first interlayer insulating layer 143, the second interlayer insulating layer 144 and the passivation layer 145 may also be formed of an inorganic material like the buffer layer 141. Thus, the gate insulating layer 142, the first interlayer insulating layer 143, the second interlayer insulating layer 144 and the passivation layer 145 may be easily damaged, such as easily cracked, while the display panel 100 is stretched. Therefore, the gate insulating layer 142, the first interlayer insulating layer 143, the second interlayer insulating layer 144 and the passivation layer 145 may not be formed in areas between the plurality of first plate patterns 121 and may be patterned into the shapes of the plurality of first plate patterns 121 and formed only on upper portions of the plurality of first plate patterns 121.

A planarization layer 146 is formed on the passivation layer 145. The planarization layer 146 serves to flatten upper portions of the switching transistor 150 and the driving transistor 160. The planarization layer 146 may be formed as a single layer or a plurality of layers and may be formed of an organic material. Thus, the planarization layer 146 may also be referred to as an organic insulating layer. For example, the planarization layer 146 may be formed of an acrylic-based organic material, but is not limited thereto.

Referring to FIG. 4, the planarization layer 146 may be disposed on the plurality of first plate patterns 121 so as to cover upper surfaces and side surfaces of the buffer layer 141, the gate insulating layer 142, the first interlayer insulating layer 143, the second interlayer insulating layer 144 and the passivation layer 145. In addition, the planarization layer 146 surrounds the buffer layer 141, the gate insulating layer 142, the first interlayer insulating layer 143, the second interlayer insulating layer 144 and the passivation layer 145 together with the plurality of first plate patterns 121. Specifically, the planarization layer 146 may be disposed to cover an upper surface and a side surface of the passivation layer 145, a side surface of the first interlayer insulating layer 143, a side surface of the second interlayer insulating layer 144, a side surface of the gate insulating layer 142, a side surface of the buffer layer 141 and a part of upper surfaces of the plurality of first plate patterns 121. Thus, the planarization layer 146 may compensate for steps between the side surfaces of the buffer layer 141, the gate insulating layer 142, the first interlayer insulating layer 143, the second interlayer insulating layer 144, and the passivation layer 145. And, the planarization layer 146 may enhance adhesion strength between the planarization layer 146 and the connection lines 181 and 182 disposed on side surfaces of the planarization layer 146.

Referring to FIG. 4, an incline angle of the side surface of the planarization layer 146 may be less than those of the side surfaces of the buffer layer 141, the gate insulating layer 142, the first interlayer insulating layer 143, the second interlayer insulating layer 144 and the passivation layer 145. For example, the side surface of the planarization layer 146 may have a gentle incline than the side surface of the passivation layer 145, the side surface of the first interlayer insulating layer 143, the side surface of the second interlayer insulating layer 144, the side surface of the gate insulating layer 142 and the side surface of the buffer layer 141. Thus, the connection lines 181 and 182 in contact with the side surfaces of the planarization layer 146 are disposed to have a gentle incline. Therefore, when the display panel 100 is stretched, a stress generated in the connection lines 181 and 182 may be reduced. Also, it is possible to suppress cracks in the connection lines 181 and 182 or peeling of the connection lines 181 and 182 from the side surface of the planarization layer 146.

Referring to FIGS. 3 to 5, the connection lines 181 and 182 refer to lines that electrically connect the pads disposed on the plurality of first plate patterns 121. The connection lines 181 and 182 are disposed on the plurality of first line patterns 122. And, the connection lines 181 and 182 may also extend on the plurality of first plate patterns 121 to be electrically connected to the gate pad GP and the data pad DP on the plurality of first plate patterns 121. Also, referring to FIG. 2, the first line pattern 122 is not disposed in an area between the plurality of first plate patterns 121, in which the connection lines 181 and 182 are not disposed.

The connection lines 181 and 182 include the first connection lines 181 and the second connection lines 182. The first connection lines 181 and the second connection lines 182 are disposed between the plurality of first plate patterns 121. Specifically, the first connection lines 181 refer to lines extended in an X-axis direction X between the plurality of first plate patterns 121 among the connection lines 181 and 182. The second connection lines 182 refer to lines extended in a Y-axis direction between the plurality of first plate patterns 121 among the connection lines 181 and 182.

The connection lines 181 and 182 may be formed of a metal material such as copper (Cu), aluminum (Al), titanium (Ti) or molybdenum (Mo), or the connection lines 181 and 182 may have a laminated structure of metal materials such as copper/molybdenum-titanium (Cu/MoTi), titanium/aluminum/titanium (Ti/Al/Ti), or the like, but are not limited thereto.

In a display panel of a general display device, various lines such as a plurality of gate lines and a plurality of data lines are extended in straight lines and are disposed between a plurality of sub-pixels, and the plurality of sub-pixels are connected to a single signal line. Therefore, in the display panel of the general display device, various lines such as a gate line, a data line, a high potential voltage line and a reference voltage line are continuously extended on a substrate from one side to the other side of the display panel of an organic light emitting display device.

Unlike this, in the display panel 100 according to an example embodiment of the present disclosure, various lines such as a gate line, a data line, a high potential voltage line, a reference voltage line, an initialization voltage line and the like which are formed in straight lines and considered to be used in a display panel of a general display device, are disposed only on the plurality of first plate patterns 121 and the plurality of second plate patterns 123. That is, in the display panel 100 according to an example embodiment of the present disclosure, lines formed in straight lines are disposed only on the plurality of first plate patterns 121 and the plurality of second plate patterns 123.

In the display panel 100 according to an example embodiment of the present disclosure, the pads on two adjacent first plate patterns 121 may be connected by the connection lines 181 and 182. Accordingly, the connection lines 181 and 182 electrically connect the gate pads GP or the data pads DP on the two adjacent first plate patterns 121. Therefore, the display panel 100 according to an example embodiment of the present disclosure may include the plurality of connection lines 181 and 182 to electrically connect various lines, such as a gate line, a data line, a high potential voltage line, a reference voltage line and the like between the plurality of first plate patterns 121. For example, gate lines may be disposed on the plurality of first plate patterns 121 disposed adjacent to each other in the first direction X. Also, the gate pads GP may be disposed on both ends of the gate lines. In this case, a plurality of gate pads GP on the plurality of first plate patterns 121 disposed adjacent to each other in the first direction X may be connected to each other by the first connection lines 181 serving as the gate lines. Therefore, the gate lines disposed on the plurality of first plate patterns 121 and the first connection lines 181 disposed on the first line patterns 122 may serve as single gate lines. The gate lines described above may be referred to as scan signal lines. Further, lines, such as an emission signal line, a low potential voltage line and a high potential voltage line which are extended in the first direction X among all of various lines that may be included in the display panel 100, may also be electrically connected by the first connection lines 181 as described above.

Referring to FIG. 3 and FIG. 5, the first connection lines 181 may connect the gate pads GP on two first plate patterns 121 that are disposed side by side among the gate pads GP on the plurality of first plate patterns 121 disposed adjacent to each other in the first direction X. The first connection line 181 may serve as a gate line, an emission signal line, a high potential voltage line, or a low potential voltage line, but is not limited thereto. The gate pads GP on the plurality of first plate patterns 121 disposed in the first direction X may be connected by the first connection lines 181 serving as the gate lines. A single gate voltage may be transferred to the gate pads GP.

Further, referring to FIG. 3 and FIG. 5, the second connection lines 182 may connect the data pads DP on two first plate patterns 121 that are disposed side by side among the data pads DP on the plurality of first plate patterns 121 disposed adjacent to each other in the second direction Y. The second connection line 182 may serve as a data line, a high potential voltage line, a low potential voltage line or a reference voltage line, but is not limited thereto. Internal lines on the plurality of first plate patterns 121 disposed in the second direction Y may be connected by a plurality of second connection lines 182 serving as the data lines. A single data voltage may be transferred thereto.

As illustrated in FIG. 5, the first connection line 181 may be disposed to be in contact with an upper surface and the side surface of the planarization layer 146 disposed on the first plate pattern 121. And, the first connection line 181 may be extended to an upper surface of the first line pattern 122. In addition, the second connection line 182 may be disposed to be in contact with the upper surface and the side surface of the planarization layer 146 disposed on the first plate pattern 121. And, the second connection line 182 may be extended to the upper surface of the first line pattern 122.

However, as illustrated in FIG. 6, there is no need for a rigid pattern to be disposed in an area where the first connection line 181 and the second connection line 182 are not disposed. Thus, the first line pattern 122, which is a rigid pattern, is not disposed under the first connection line 181 and the second connection line 182.

Meanwhile, referring to FIG. 4, a bank 147 is formed on a first connection pad CNT1, the connection lines 181 and 182 and the planarization layer 146. The bank 147 is a component to distinguish adjacent sub-pixels SPX. The bank 147 is disposed to cover at least a part of the pad PD, the connection lines 181 and 182 and the planarization layer 146. The bank 147 may be formed of an insulating material. Further, the bank 147 may contain a black material. Since the bank 147 contains a black material, the bank 147 serves to hide lines which are visible through the active area AA. The bank 147 may be formed of, for example, a transparent carbon-based mixture. Specifically, the bank 147 may contain carbon black, but is not limited thereto. The bank 147 may also be formed of a transparent insulating material. Also, although a height of the bank 147 is shown to be lower than a height of the LED 170 in FIG. 2, the height of the bank 147 is not limited thereto, and the height of the bank 147 may be equal to the height of the LED 170.

Referring to FIG. 4, the LED 170 is disposed on the first connection pad CNT1 and a second connection pad CNT2. The LED 170 includes an n-type layer 171, an active layer 172, a p-type layer 173, an n-electrode 174 and a p-electrode 175. The LED 170 of the display panel 100 according to an example embodiment of the present disclosure has a flip-chip structure in which the n-electrode 174 and the p-electrode 175 are formed on one surface thereof.

The n-type layer 171 may be formed by injecting n-type impurities into gallium nitride (GaN) having excellent crystallinity. The n-type layer 171 may be disposed on a separate base substrate which is formed of a light emitting material.

The active layer 172 is disposed on the n-type layer 171. The active layer 172 is a light emitting layer that emits light in the LED 170 and may be formed of a nitride semiconductor, for example, indium gallium nitride (InGaN). The p-type layer 173 is disposed on the active layer 172. The p-type layer 173 may be formed by injecting p-type impurities into gallium nitride (GaN).

As described above, the LED 170 according to an example embodiment of the present disclosure is manufactured by sequentially laminating the n-type layer 171, the active layer 172, and the p-type layer 173, and then, etching a predetermined area of the layers to thereby form the n-electrode 174 and the p-electrode 175. In this case, the predetermined area is a space to separate the n-electrode 174 and the p-electrode 175 from each other and is etched to expose a part of the n-type layer 171. In other words, a surface of the LED 170 on which the n-electrode 174 and the p-electrode 175 are to be disposed may not be flat and may have different levels of height.

In this manner, the n-electrode 174 is disposed in the etched area, and the n-electrode 174 may be formed of a conductive material. In addition, the p-electrode 175 is disposed in a non-etched area, and the p-electrode 175 may also be formed of a conductive material. For example, the n-electrode 174 is disposed on the n-type layer 171 exposed by an etching process, and the p-electrode 175 is disposed on the p-type layer 173. The p-electrode 175 may be formed of the same material as the n-electrode 174.

An adhesive pattern AD is disposed on upper surfaces of the first connection pad CNT1 and the second connection pad CNT2 and between the first connection pad CNT1 and the second connection pad CNT2. Thus, the LED 170 may be bonded onto the first connection pad CNT1 and the second connection pad CNT2. In this case, the n-electrode 174 may be disposed on the second connection pad CNT2 and the p-electrode 175 may be disposed on the first connection pad CNT1.

The adhesive pattern AD may be a conductive adhesive pattern formed by dispersing conductive balls in an insulating base member. Thus, when heat or pressure is applied to the adhesive pattern AD, the conductive balls are electrically connected to have conductive properties in a portion of the adhesive pattern AD to which heat or pressure is applied. Also, an area of the adhesive pattern AD to which pressure is not applied may have insulating properties. For example, the n-electrode 174 is electrically connected to the second connection pad CNT2 through the adhesive pattern AD, and the p-electrode 175 is electrically connected to the first connection pad CNT1 through the adhesive pattern AD. After applying the adhesive pattern AD onto an upper surface of the second connection pad CNT2 and the first connection pad CNT1 by an inkjet method or the like, the LED 170 may be transferred onto the adhesive pattern AD. Then, the LED 170 may be pressed and heated to thereby electrically connect the first connection pad CNT1 to the p-electrode 175 and the second connection pad CNT2 to the n-electrode 174. However, other portions of the adhesive pattern AD excluding a portion of the adhesive pattern AD disposed between the n-electrode 174 and the second connection pad CNT2 and a portion of the adhesive pattern AD disposed between the p-electrode 175 and the first connection pad CNT1 have insulating properties. Meanwhile, the adhesive pattern AD may be separately disposed on each of the first connection pad CNT1 and the second connection pad CNT2.

Further, the first connection pad CNT1 is electrically connected to the drain electrode 164 of the driving transistor 160 and receives a driving voltage for driving the LED 170 from the driving transistor 160. Although FIG. 4 illustrates that the first connection pad CNT1 and the drain electrode 164 of the driving transistor 160 are indirectly connected to each other without directly contacting them, the present disclosure is not limited thereto, and the first connection pad CNT1 and the drain electrode 164 of the driving transistor 160 may be in direct contact. In addition, a low potential driving voltage for driving the LED 170 is applied to the second connection pad CNT2. Accordingly, when the display panel 100 is turned on, different voltage levels that are applied to the first connection pad CNT1 and the second connection pad CNT2 are respectively transferred to the n-electrode 174 and the p-electrode 175, so that the LED 170 emits light.

The upper substrate 112 serves to support various components disposed under the upper substrate 112. Specifically, the upper substrate 112 may be formed by coating and hardening a material for forming the upper substrate 112 on the lower substrate 111 and the first plate patterns 121, and thus, may be disposed to be in contact with the lower substrate 111, the first plate patterns 121, the first line pattern 122 and the connection lines 181 and 182.

The upper substrate 112 may be formed of the same material as the lower substrate 111. For example, the upper substrate 112 may be formed of silicone rubber such as polydimethylsiloxane (PDMS) or elastomers such as polyurethane (PU), polytetrafluoroethylene (PTFE) and the like. Thus, the upper substrate 112 may have flexibility. However, the materials of the upper substrate 112 are not limited thereto.

Meanwhile, although not illustrated in FIG. 4, a polarizing layer may also be disposed on the upper substrate 112. The polarizing layer polarizes light incident from the outside of the display panel 100 and reduces reflection of external light. Further, instead of the polarizing layer, other optical films or the like may be disposed on the upper substrate 112.

In addition, the first filling layer 190 that is disposed on an entire surface of the lower substrate 111 and fills a gap between components disposed on the upper substrate 112 and the lower substrate 111 may be disposed. The first filling layer 190 may be formed of a curable adhesive. Specifically, a material for forming the first filling layer 190 is coated on the entire surface of the lower substrate 111 and then cured, so that the first filling layer 190 may be disposed between components disposed on the upper substrate 112 and the lower substrate 111. For example, the first filling layer 190 may be an optically clear adhesive (OCA), and may include an acrylic adhesive, a silicone adhesive, and a urethane adhesive.

Circuit Structure of Active Area

Figure 7:
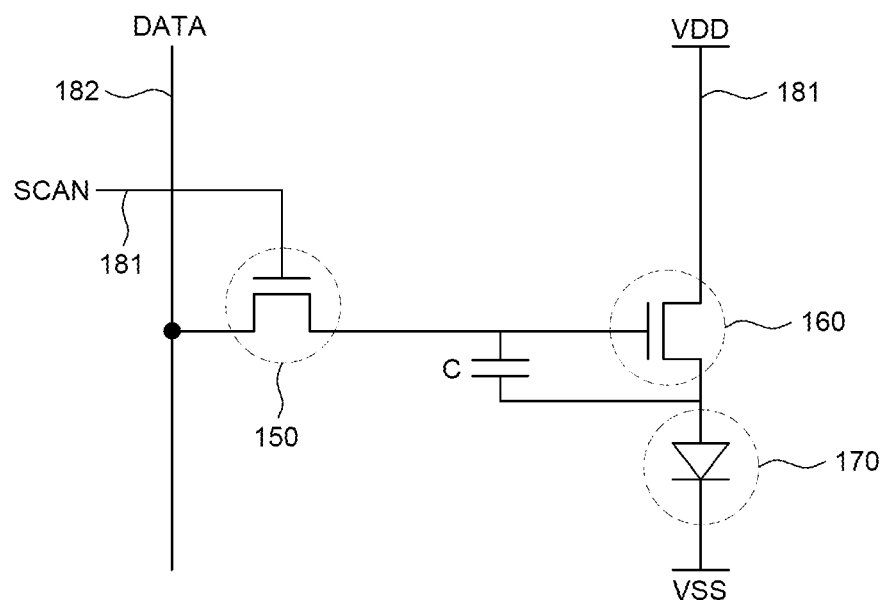
FIG. 7 is a circuit diagram of a sub-pixel of the display panel of the display device according to an example embodiment of the present disclosure.

FIG. 7 is a circuit diagram of a sub-pixel of the display panel of the display device according to an example embodiment of the present disclosure.

Hereinafter, for convenience of explanation, a structure and operations of the sub-pixel SPX of the display panel in the display device according to an example embodiment of the present disclosure in a case in which the sub-pixel SPX is a 2T (Transistor) 1C (Capacitor) pixel circuit will be described, but the present disclosure is not limited thereto.

Referring to FIGS. 4 and 7, the sub-pixel SPX of the display panel in the display device according to an example embodiment of the present disclosure may be configured to include the switching transistor 150, the driving transistor 160, a storage capacitor C, and the LED 170.

The switching transistor 150 applies a data signal DATA that is supplied through the second connection line 182 to the driving transistor 160 and the storage capacitor C according to a gate signal SCAN that is supplied through the first connection line 181.

In addition, the gate electrode 151 of the switching transistor 150 is electrically connected to the first connection line 181, the source electrode 153 of the switching transistor 150 is connected to the second connection line 182, and the drain electrode 154 of the switching transistor 150 is connected to the gate electrode 161 of the driving transistor 160.

The driving transistor 160 may operate so that a driving current according to the data voltage DATA and a high potential power VDD supplied through the first connection line 181 can flow in response to the data voltage DATA stored in the storage capacitor C.

In addition, the gate electrode 161 of the driving transistor 160 is electrically connected to the drain electrode 154 of the switching transistor 150, the source electrode of the driving transistor 160 is connected to the first connection line 181, and the drain electrode 164 of the driving transistor 160 is connected to the LED 170.

The LED 170 may operate to emit light according to the driving current that is formed by the driving transistor 160. And, as described above, the n-electrode 174 of the LED 170 may be connected to the first connection line 181 and receive a low potential power VSS, and the p-electrode 175 of the LED 170 may be connected to the drain electrode 164 of the transistor 160 and receive a driving voltage corresponding to the driving current.

The sub-pixel SPX of the display panel in the display device according to an example embodiment of the present disclosure is configured to have a 2T1C structure including the switching transistor 150, the driving transistor 160, the storage capacitor C, and the LED 170, but in a case in which a compensation circuit is added, it may be configured to have various structures such as 3T1C, 4T2C, 5T2C, 6T1C, 6T2C, 7T1C, 7T2C and the like.

As described above, the display panel of the display device according to an example embodiment of the present disclosure may include a plurality of sub-pixels on a first substrate that is a rigid substrate, and each of the plurality of sub-pixels SPX may be configured to include a switching transistor, a driving transistor, a storage capacitor, and an LED.

Accordingly, the display panel of the display device according to an example embodiment of the present disclosure can be stretched by a lower substrate and also has a pixel circuit of a 2T1C structure on each first substrate, so that it can emit light depending on a data voltage in accordance with each gate timing.

Hereinafter, the touch panel of the display device according to an example embodiment of the present disclosure will be described in detail with reference to FIGS. 8 to 9A.

Touch Panel Structure

Figure 8:
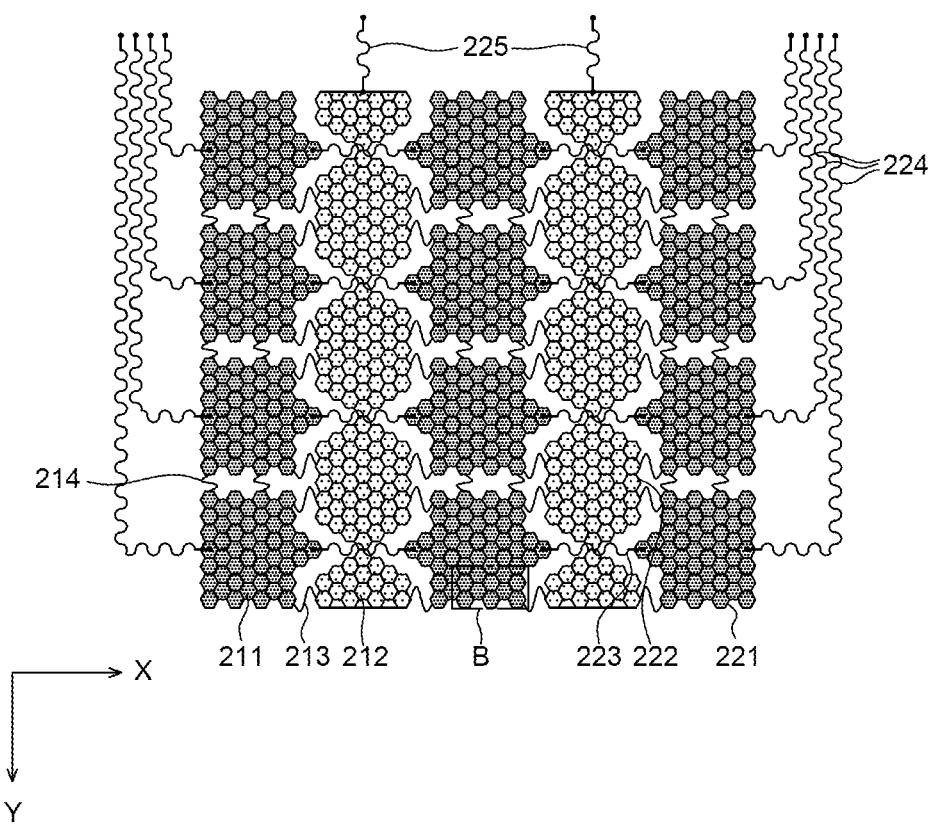
FIG. 8 is a plan view of a touch panel of the display device according to an example embodiment of the present disclosure.

FIG. 8 is a plan view of a touch panel of the display device according to an example embodiment of the present disclosure.

Figure 9A:
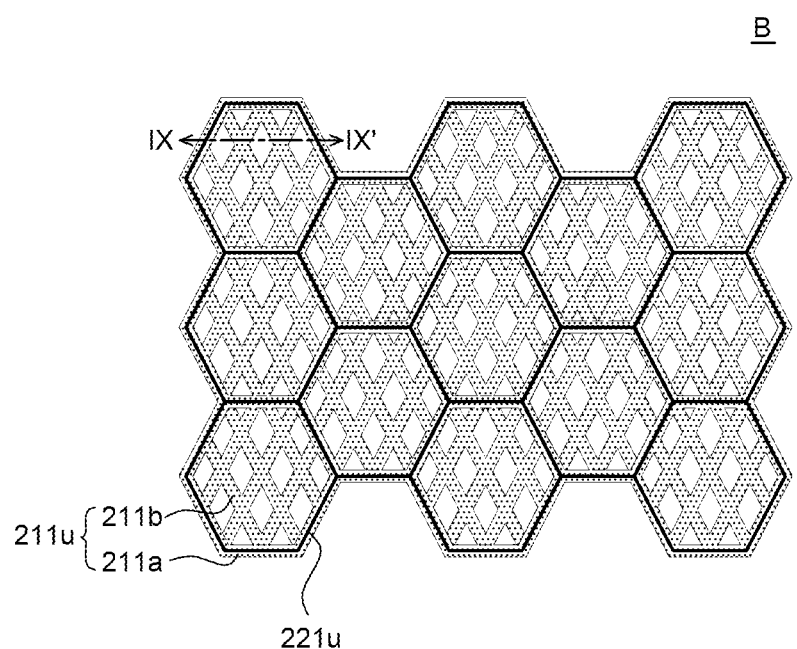
FIG. 9A is an enlarged plan view of area B illustrated in FIG. 8.

FIG. 9A is an enlarged plan view of area B illustrated in FIG. 8.

Figure 9B:
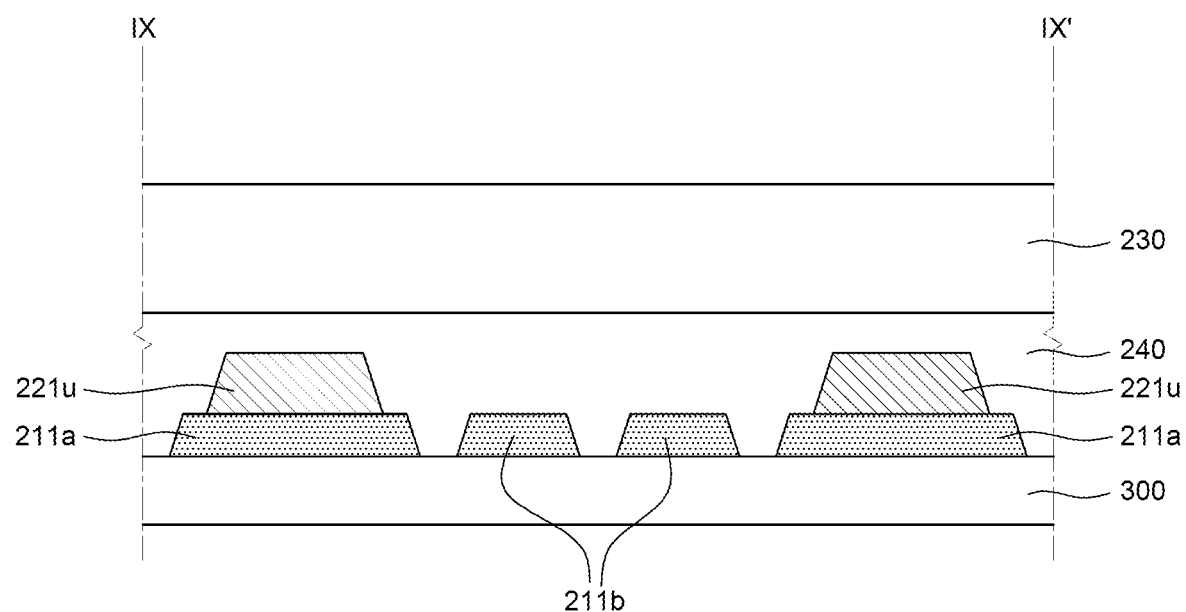
FIG. 9B is a cross-sectional view taken along cutting line IX-IX' illustrated in FIG. 9A.

FIG. 9B is a cross-sectional view taken along cutting line IX-IX' illustrated in FIG. 9A.

As illustrated in FIGS. 7 to 9B, the touch panel may include the touch pattern layer 210, the touch electrode layer 220, and the touch substrate 230.

The touch pattern layer 210 may include a plurality of stretching patterns 211 and 212. The stretching patterns refers to stretchable pattern structures comprised of unit patterns or unit pattern structures. These patterns or pattern structures are capable of being easily extended and/or expanded and later resuming their former size or shape. Their might also be called resilient or resilient patterns. The plurality of stretching patterns 211 and 212 include first stretching patterns 211 and second stretching patterns 212 having different shapes. Specifically, a plurality of the first stretching patterns 211 may be disposed in the second direction Y. In addition, a plurality of the second stretching patterns 212 may be disposed adjacent to the plurality of first stretching patterns 211 in the first direction X, and may be disposed in the second direction Y.

Each of the plurality of stretching patterns 211 and 212 may include a plurality of unit patterns 211u. Specifically, as illustrated in FIGS. 9A and 9B, each of the plurality of unit patterns 211u constituting the first stretching pattern 211 may include a first sub-unit pattern 211a and a second sub-unit pattern 211b disposed inside the first sub-unit pattern 211a.

For example, as illustrated in FIG. 9A, the first sub-unit pattern 211a may have a hexagonal shape. However, the present disclosure is not limited thereto, and the first sub-unit pattern 211a may be deformed into a polygonal shape such as an octagonal shape or a circular shape. In addition, the second sub-unit pattern 211b may have a mesh shape.

Accordingly, an empty space exists within each of the plurality of unit patterns 211*u*, so that each of the plurality of unit patterns 211*u* may expand and contract in the first direction X and the second direction Y. Accordingly, the first stretching pattern 211 including the plurality of unit patterns 211*u* may also extend in the first direction X and the second direction Y.

Although only the first stretching pattern 211 is illustrated in FIGS. 9A and 9B, the second stretching pattern 212 may also include the plurality of unit patterns 211*u* described above. Accordingly, the second stretching pattern 212 may also extend in the first direction X and the second direction Y.

Referring to FIG. 8, the touch pattern layer 210 may include a first connection pattern 213 connecting the plurality of stretching patterns 211 and 212 disposed in the first direction X and a second connection pattern 214 connecting the plurality of stretching patterns 211 and 212 disposed in the second direction Y.

For example, the first connection pattern 213 may connect the first stretching pattern 211 and the second stretching pattern 212 adjacent to each other in the first direction X. In addition, the second connection pattern 214 may connect the plurality of first stretching patterns 211 adjacent to each other in the second direction Y.

In addition, each of the first connection pattern 213 and the second connection pattern 214 has a wavy shape. For example, each of the first connection pattern 213 and the second connection pattern 214 may have a sine wave shape. However, the shape of each of the first connection pattern 213 and the second connection pattern 214 is not limited thereto, and, for example, each of the first connection pattern 213 and the second connection pattern 214 may be extended in a zigzag shape. Alternatively, each of the first connection pattern 213 and the second connection pattern 214 may have various shapes, such as shapes in which a plurality of rhombus-shaped substrates are extended by being connected at vertices thereof.

Accordingly, the first connection pattern 213 and the second connection pattern 214 may physically connect the plurality of first stretching patterns 211 and the second stretching patterns 212. Accordingly, even when the touch panel 200 is stretched, arrangements of the plurality of first stretching patterns 211 and the second stretching patterns 212 may be maintained.

Meanwhile, the first stretching patterns 211, the second stretching patterns 212, the first connection pattern 213, and the second connection pattern 214 that constitute the touch pattern layer 210 may be formed of a plastic material having low flexibility. For example, the first stretching patterns 211, the second stretching patterns 212, the first connection pattern 213, and the second connection pattern 214 that constitute the touch pattern layer 210 may be formed of at least one material among polyimide (PI), polyacrylate or polyacetate.

The touch electrode layer 220 may include a plurality of touch electrodes 221 and 222, bridge lines 223, and a plurality of routing lines 224 and 225. In some embodiments, the touch electrode layer 220 also includes bridge lines 223.

The plurality of touch electrodes 221 and 222 may include a plurality of first touch electrodes 221 extending in the first direction X and a plurality of second touch electrodes 222 extending in the second direction Y. In addition, the plurality of first touch electrodes 221 and the plurality of second touch electrodes 222 may be formed of metal layers disposed on the same layer. Accordingly, the first touch electrodes 221 may be electrically connected through the bridge lines 223 extending in the first direction X, but the second touch electrodes 222 may be electrically connected without a separate bridge line. The bridge line 223 described above may be formed of a metal layer disposed on a layer different from the first touch electrodes 221 and the plurality of second touch electrodes 222.

Each of the plurality of touch electrodes 221 and 222 may include a plurality of unit electrodes 221*u*. Specifically, as illustrated in FIGS. 9A and 9B, each of the plurality of unit electrodes 221*u* constituting the first touch electrode 221 may have a hexagonal shape. However, the present disclosure is not limited thereto, and each of the plurality of unit electrodes 221*u* may be deformed into a polygonal shape such as an octagonal shape or a circular shape. Each of the plurality of touch electrodes 221 and 222 may have a honeycomb shape.

In addition, each of the plurality of unit electrodes 221*u* may be disposed on the first sub-unit pattern 211*a*. That is, each of the plurality of unit electrodes 221*u* may overlap the first sub-unit pattern 211*a*.

Accordingly, an empty space exists within each of the plurality of unit electrodes 221*u*, and each of the plurality of unit electrodes 221*u* may expand and contract in the first direction X and the second direction Y. Accordingly, the first touch electrode 221 including the plurality of unit electrodes 221*u* may also extend in the first direction X and the second direction Y.

Although only the first touch electrode 221 is illustrated in FIGS. 9A and 9B, the second touch electrode 222 may also include the plurality of unit electrodes 221*u* described above. Accordingly, the second touch electrode 222 may also extend in the first direction X and the second direction Y.

Meanwhile, although it has been described that the plurality of touch electrodes 221 and 222 are all formed of the plurality of unit electrodes 221*u*, the plurality of unit electrodes 221*u* may be defined as being divided into a plurality of first unit electrodes constituting the first touch electrode 221 and a plurality of second unit electrodes constituting the second touch electrode 222, but the present disclosure is not limited thereto.

Referring to FIG. 8, the touch electrode layer 220 may further include the first routing lines 224 that are electrically connected to the first touch electrodes 221 and the second routing lines 225 that are electrically connected to the second touch electrodes 222.

For example, each of the plurality of first routing lines 224 are connected to both sides of the first touch electrodes 221 in the first direction X, and each of the second routing lines 225 are connected to one sides of the second touch electrodes 222 in the second direction Y.

Accordingly, a touch driving signal may be transmitted to the first touch electrode 221 through each of the plurality of first routing lines 224, and a touch sensing signal that is applied to the second touch electrode 222 may be transmitted to a touch driver through each of the plurality of second routing lines 225.

Accordingly, each of the plurality of first touch electrodes 221 may perform a function of a touch transmission electrode (a Tx electrode) applying a touch driving signal, and each of the plurality of second touch electrodes 222 may perform a function of a touch receiving electrode (an Rx electrode) to which a touch sensing signal is applied.

Conversely, a touch sensing signal that is applied to the first touch electrode 221 may be transmitted to the touch driver through each of the plurality of first routing lines 224, and a touch driving signal may be transmitted to the second touch electrode 222 through each of the plurality of second routing lines 225. In this case, the plurality of first touch electrodes 221 may function as touch receiving electrodes (Rx electrodes) to which the touch sensing signal is applied, and the plurality of second touch electrodes 222 may function as touch transmission electrodes (Tx electrodes) to which the touch driving signal is applied.

And, each of the bridge line 223, the first routing line 224 and the second routing line 225 has a wavy shape. For example, each of the bridge line 223, the first routing line 224 and the second routing line 225 may have a sine wave shape. However, the shape of each of the first connection pattern 213 and the second connection pattern 214 is not limited thereto, and, for example, each of the bridge line 223, the first routing line 224 and the second routing line 225 may extend in a zigzag shape. Alternatively, each of the bridge line 223, the first routing line 224 and the second routing line 225 may have various shapes, such as shapes in which a plurality of rhombus-shaped substrates are extended by being connected at vertices thereof.

Accordingly, since each of the bridge line 223, the first routing line 224 and the second routing line 225 is stretchable, the touch electrode layer 220 may also be stretchable.

The plurality of touch electrodes 221 and 222, the bridge lines 223, and the plurality of routing lines 224 and 225 that constitute the touch electrode layer 220 may be formed of any one of various metal materials, for example, molybdenum (Mo), aluminum (Al), chromium (Cr), gold (Au), titanium (Ti), nickel (Ni), neodymium (Nd) and copper (Cu), or an alloy of two or more of them, or multiple layers thereof, but the present disclosure is not limited thereto.

And, referring to FIG. 9B, the touch substrate 230 may be disposed on the touch electrode layer 220. The touch substrate 230 is disposed on an uppermost portion of the display device, and is a component that is directly touched by a finger or a pen. In addition, the touch substrate 230 may be formed of an insulating material that can be bent or stretched as a flexible substrate. For example, the touch substrate 230 may be formed of silicone rubber such as polydimethylsiloxane (PDMS) or elastomers such as polyurethane (PU) and polytetrafluoroethylene (PTFE), and thus, may have flexible properties.

A second filling layer 240 that fills a space between components disposed under the touch substrate 230 may be disposed. The second filling layer 240 may be formed of a curable adhesive. Specifically, a material constituting the second filling layer 240 is coated on an entire surface of the touch substrate 230 and then, is cured, so that the second filling layer 240 may be disposed between the components disposed under the touch substrate 230. For example, the second filling layer 240 may be an optically clear adhesive (OCA), and may include an acrylic adhesive, a silicone adhesive, and a urethane adhesive.

As described above, in the touch panel 200 of the display device according to an example embodiment of the present disclosure, the stretchable touch electrode 220 may be disposed on the stretchable touch pattern layer 210. Accordingly, even when the touch panel 200 is stretched, it is possible to disperse stretching stress applied to the touch electrodes 221 and 222 due to the touch pattern layer 210. Accordingly, stretching reliability of the touch panel of the display device according to an example embodiment of the present disclosure may be improved.

Figure 10A:
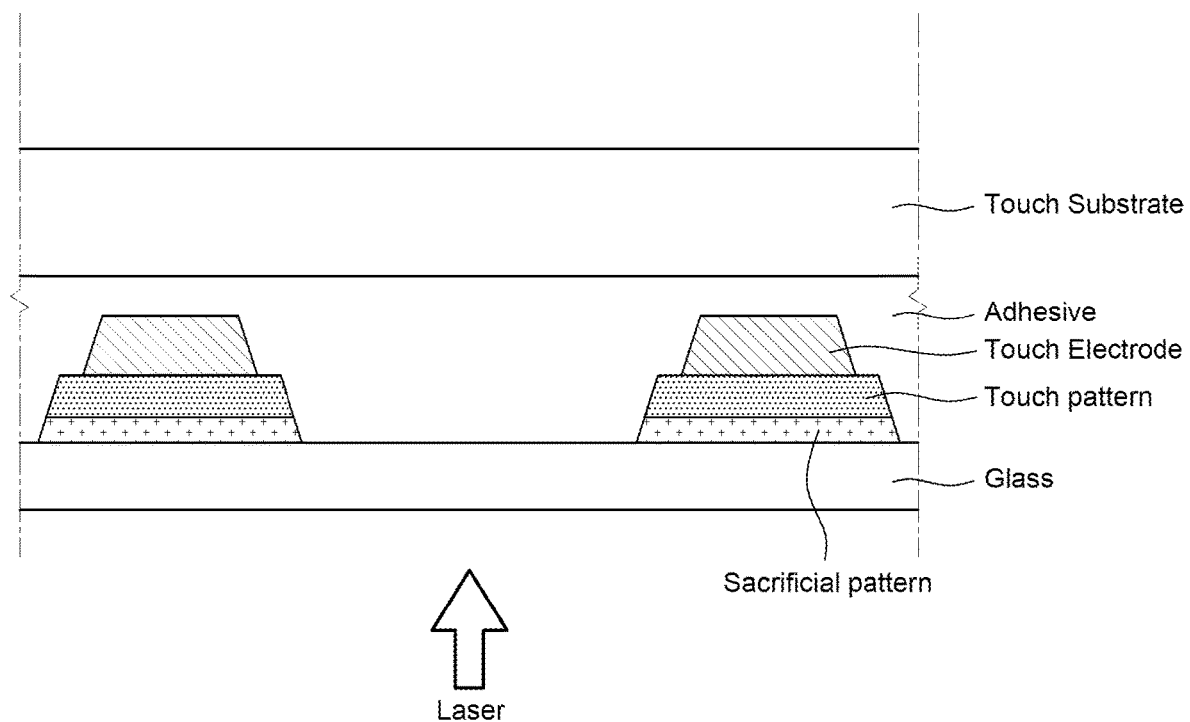
FIG. 10A is a cross-sectional view illustrating a laser lift off (LLO) process of a conventional touch panel.

FIG. 10A is a cross-sectional view illustrating a laser lift off (LLO) process of a conventional touch panel.

Figure 10B:
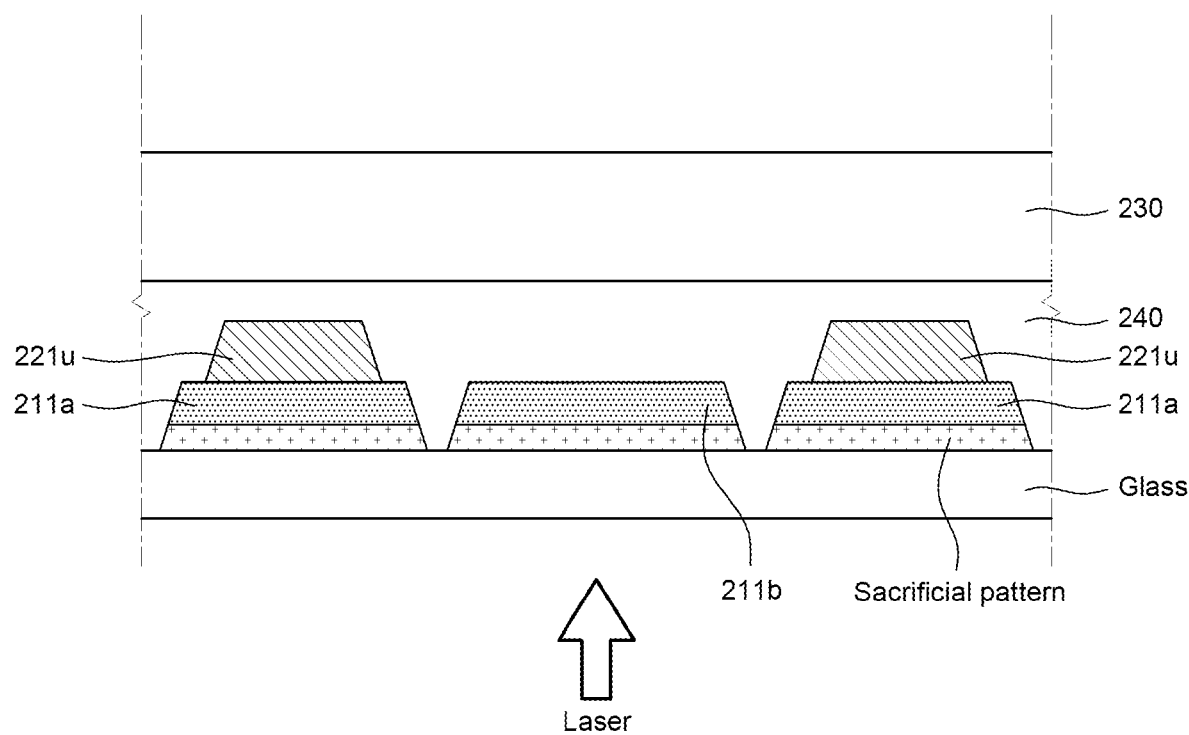
FIG. 10B is a cross-sectional view illustrating a laser lift off (LLO) process of the touch panel of the display device according to an example embodiment of the present disclosure.

FIG. 10B is a cross-sectional view illustrating a laser lift off (LLO) process of the touch panel of the display device according to an example embodiment of the present disclosure.

Referring to FIG. 10A, a conventional touch panel was manufactured by forming a sacrificial pattern on a glass substrate (Glass), and stacking a touch pattern and a touch electrode thereon. Then, a laser was irradiated to a lower portion of the glass substrate to thereby separate the glass substrate and the sacrificial pattern. Then, the touch pattern and the touch electrode that are separated were attached to a display panel to thereby form a display device.

However, as illustrated in FIG. 10A, since a contact area between the glass substrate and an adhesive filling layer (adhesive) that is filled on the touch electrode is relatively wide, there occurred a defect in which the glass substrate is not separated from the adhesive filling layer (adhesive) even when a laser is irradiated to the lower portion of the glass substrate.

As illustrated in FIG. 10B, in the touch panel 200 of the display device according to an example embodiment of the present disclosure, the second sub-unit pattern 211b may be further disposed between the second filling layer 240 and the glass substrate. Accordingly, a contact area between the second filling layer 240 and the glass substrate may be relatively narrow, so that the glass substrate may be easily separated from the second filling layer 240 when a laser is irradiated to the lower portion of the glass substrate.

Accordingly, laser lift off (LLO) process efficiency for the touch panel of the display device according to an example embodiment of the present disclosure may be increased.

Hereinafter, a touch panel of a display device according to another example embodiment of the present disclosure will be described. Since the touch panel of the display device according to an example embodiment of the present disclosure and the touch panel of the display device according to another example embodiment of the present disclosure differ only in terms of a shape of a second sub-unit pattern and a sub-connection pattern, only these differences will be described. In addition, redundant contents of the touch panel of the display device according to an example embodiment of the present disclosure and the display device according to another example embodiment of the present disclosure are omitted, and the same reference numerals are used for the same components.

Figure 11A:
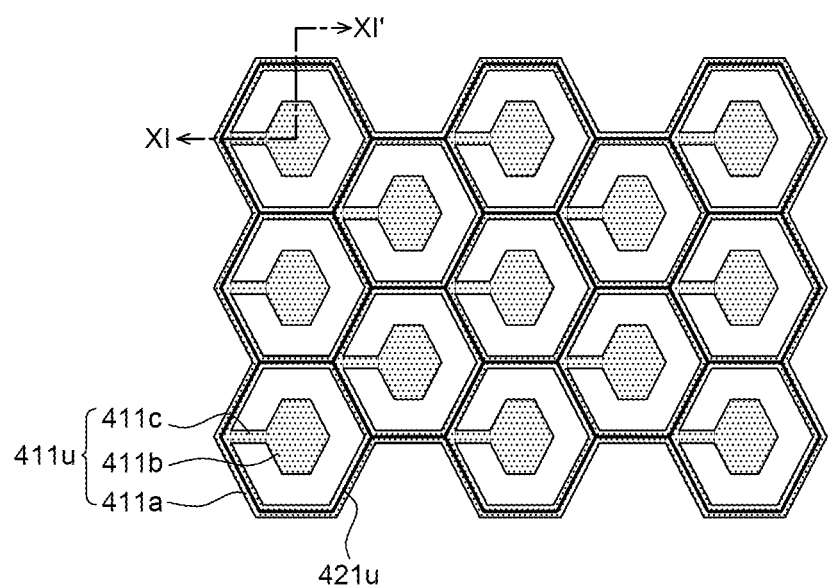
FIG. 11A is an enlarged plan view of a touch panel of a display device according to another example embodiment of the present disclosure.

FIG. 11A is an enlarged plan view of a touch panel of a display device according to another example embodiment of the present disclosure.

Figure 11B:
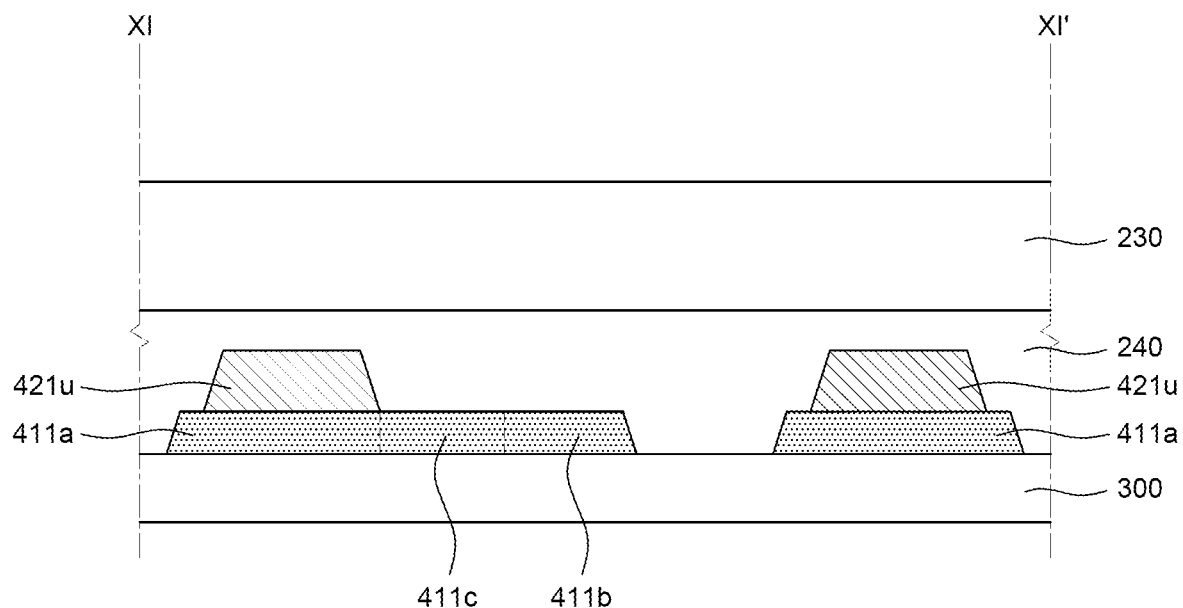
FIG. 11B is a cross-sectional view taken along cutting line XI-XI' illustrated in FIG. 11A.

FIG. 11B is a cross-sectional view taken along cutting line XI-XI' illustrated in FIG. 11A.

Each of a plurality of stretching patterns may include a plurality of unit patterns 411u. Specifically, as illustrated in FIGS. 11A and 111B, each of the plurality of unit patterns 411u constituting each of the plurality of stretching patterns may include a first sub-unit pattern 411a and a second sub-unit pattern 411b disposed inside the first sub-unit pattern 411a.

For example, as illustrated in FIG. 11A, the first sub-unit pattern 411a may have a hexagonal shape. However, the present disclosure is not limited thereto, and the first sub-unit pattern 411a may be deformed into a polygonal shape such as an octagonal shape or a circular shape.

In addition, the second sub-unit pattern 411b may also have a hexagonal shape. However, the present disclosure is not limited thereto, and the second sub-unit pattern 411b may also be deformed into a polygonal shape such as an octagonal shape or a circular shape. However, since the second sub-unit pattern 411b is disposed inside the first sub-unit pattern 411a, a size of the second sub-unit pattern 411b may be smaller than a size of the first sub-unit pattern 411a.

In addition, although it is illustrated that there is no empty space inside the second sub-unit pattern 411b in FIG. 11A, the present disclosure is not limited thereto, and an empty space may exist inside the second sub-unit pattern 411b.

Accordingly, an empty space exists between the first sub-unit pattern 411a and the second sub-unit pattern 411b within each of the plurality of unit patterns 411u, so that each of the plurality of unit patterns 411u may expand and contract in the first direction X and the second direction Y. Accordingly, each of the plurality of stretching patterns including the plurality of unit patterns 411u may also extend in the first direction X and the second direction Y.

In addition, the touch panel of the display device according to another example embodiment of the present disclosure may further include a sub-connection pattern 411c connecting the first sub-unit pattern 411a and the second sub-unit pattern 411b.

Accordingly, since the first sub-unit pattern 411a and the second sub-unit pattern 411b are physically connected, they are not separated even when the touch panel of the display device according to another example embodiment of the present disclosure is stretched, so that structural stability may be achieved.

In addition, each of the plurality of unit electrodes 421u may be disposed on the first sub-unit pattern 411a. That is, each of the plurality of unit electrodes 421u may overlap the first sub-unit pattern 411a.

Accordingly, an empty space exists within each of the plurality of unit electrodes 421u, so that each of the plurality of unit electrodes 421u may expand and contract in the first direction X and the second direction Y. Accordingly, a plurality of touch electrodes that include the plurality of unit electrodes 421u may also extend in the first direction X and the second direction Y.

As described above, the touch panel of the display device according to another example embodiment of the present disclosure may also allow a stretchable touch electrode to be disposed on a stretchable touch pattern layer. Accordingly, stretching reliability of the touch panel of the display device according to another example embodiment of the present disclosure may be improved.

Also, as illustrated in FIG. 11B, in the touch panel of the display device according to another example embodiment of the present disclosure, the second sub-unit pattern 411b and the sub-connection pattern 411c are further disposed between the second filling layer 240 and the glass substrate. Accordingly, a contact area between the second filling layer 240 and the glass substrate may be relatively narrowed, and thus, laser lift off (LLO) process efficiency for the touch panel may be increased.

Hereinafter, a touch panel of a display device according to still another example embodiment (a third example embodiment) of the present disclosure will be described. The touch panel of the display device according to an example embodiment of the present disclosure and the touch panel of the display device according to still another example embodiment (the third example embodiment) of the present disclosure differ only in terms of a shape of a second sub-unit pattern and a sub-connection pattern. Therefore, only these differences will be described. In addition, redundant contents of the touch panel of the display device according to an example embodiment of the present disclosure and the display device according to still another example embodiment (the third example embodiment) of the present disclosure are omitted, and the same reference numerals are used for the same components.

Figure 12A:
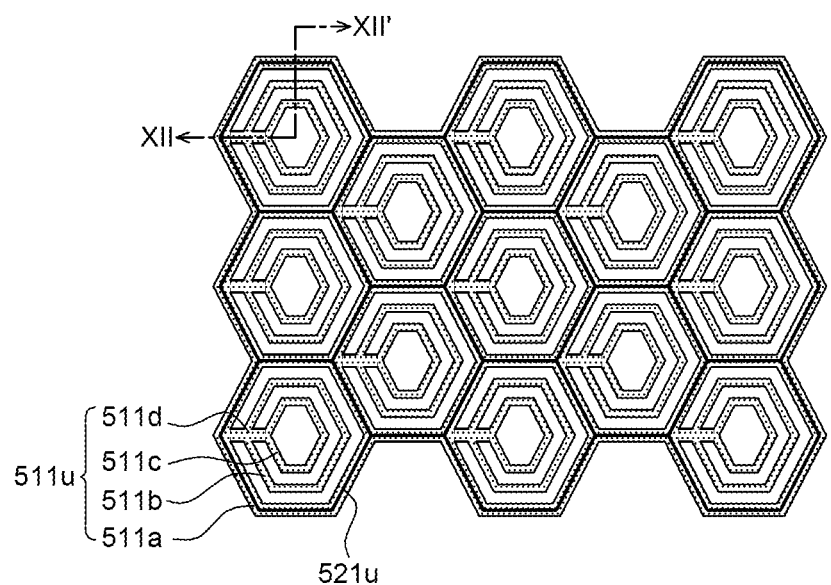
FIG. 12A is an enlarged plan view of a touch panel of a display device according to still another example embodiment (a third example embodiment) of the present disclosure.

FIG. 12A is an enlarged plan view of a touch panel of a display device according to still another example embodiment (a third example embodiment) of the present disclosure.

Figure 12B:
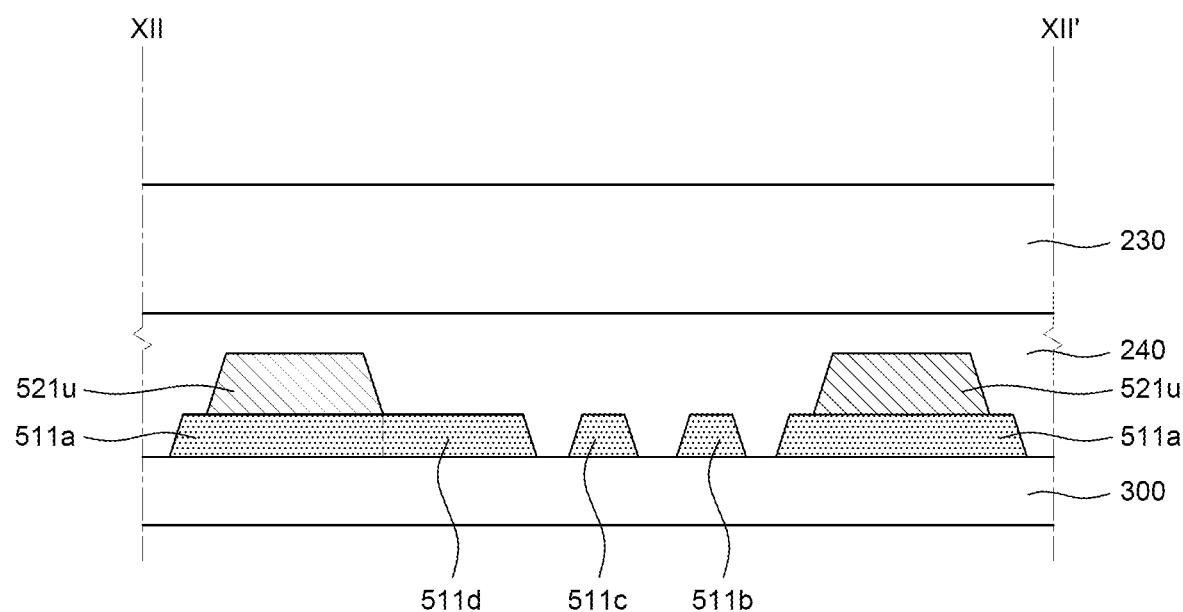
FIG. 12B is a cross-sectional view taken along cutting line XII-XII' illustrated in FIG. 12A.

FIG. 12B is a cross-sectional view taken along cutting line XII-XII' illustrated in FIG. 12A.

Each of a plurality of stretching patterns may include a plurality of unit patterns 511u. Specifically, as illustrated in FIGS. 12A and 12B, each of the plurality of unit patterns 511u constituting each of the plurality of stretching patterns may include a first sub-unit pattern 511a, a second sub-unit pattern 511b disposed inside the first sub-unit pattern 511a, and a third sub-unit pattern 511c disposed inside the second sub-unit pattern 511b.

For example, as illustrated in FIG. 12A, the first sub-unit pattern 511a may have a hexagonal shape. However, the present disclosure is not limited thereto, and the first sub-unit pattern 511a may be deformed into a polygonal shape such as an octagonal shape or a circular shape.

In addition, the second sub-unit pattern 511b may also have a hexagonal shape. However, the present disclosure is not limited thereto, and the second sub-unit pattern 511b may also be deformed into a polygonal shape such as an octagonal shape or a circular shape. However, since the second sub-unit pattern 511b is disposed inside the first sub-unit pattern 511a, a size of the second sub-unit pattern 511b may be smaller than a size of the first sub-unit pattern 511a.

In addition, the third sub-unit pattern 511c may also have a hexagonal shape. However, the present disclosure is not limited thereto and the third sub-unit pattern 511c may also be deformed into a polygonal shape such as an octagonal shape or a circular shape. However, since the third sub-unit pattern 511c is disposed inside the second sub-unit pattern 511b, a size of the third sub-unit pattern 511c may be smaller than the size of the second sub-unit pattern 511b.

In addition, although it is illustrated that an empty space exists within the third sub-unit pattern 511c in FIG. 12A, the present disclosure is not limited thereto, and no empty space may exist inside the third sub-unit pattern 511c.

Accordingly, within each of the plurality of unit patterns 511u, an empty space exists between the first sub-unit pattern 511a and the second sub-unit pattern 511b and an empty space exists between the second sub-unit pattern 511b and the third sub-unit pattern 511c, so that each of the plurality of unit patterns 511u may expand and contract in the first direction X and the second direction Y. Accordingly, each of the plurality of stretching patterns including the plurality of unit patterns 511u may also extend in the first direction X and the second direction Y.

And, the touch panel of the display device according to still another example embodiment (the third example embodiment) of the present disclosure may further include a sub-connection pattern 511d that connects the first sub-unit pattern 511a, the second sub-unit pattern 511b, and the third sub-unit pattern 511c.

Accordingly, since the first sub-unit pattern 511a, the second sub-unit pattern 511b, and the third sub-unit pattern 511c are physically connected, they are not separated even when the touch panel of the display device according to still another example embodiment (the third example embodiment) is stretched, so that structural stability may be achieved.

In addition, each of the plurality of unit electrodes 521u may be disposed on the first sub-unit pattern 511a. That is, each of the plurality of unit electrodes 521u may overlap the first sub-unit pattern 511a.

Accordingly, an empty space exists within each of the plurality of unit electrodes 521u, and each of the plurality of unit electrodes 521u may expand and contract in the first direction X and the second direction Y. Accordingly, the plurality of touch electrodes including the plurality of unit electrodes 521u may also extend in the first direction X and the second direction Y.

As described above, the touch panel of the display device according to still another example embodiment (third example embodiment) of the present disclosure may also allow a stretchable touch electrode to be disposed on a stretchable touch pattern layer. Accordingly, stretching reliability of the touch panel of the display device according to still another example embodiment (third example embodiment) of the present disclosure may be improved.

In addition, as illustrated in FIG. 10B, in the touch panel of the display device according to still another example embodiment (third example embodiment) of the present disclosure, the second sub-unit pattern 511b, the third sub-unit pattern 511c, and the sub-connection pattern 511d may be further disposed between the second filling layer 240 and the glass substrate. Accordingly, a contact area between the second filling layer 240 and the glass substrate may be relatively narrowed, and thus, laser lift off (LLO) process efficiency for the touch panel may be increased.

Hereinafter, a touch panel of a display device according to still another example embodiment (a fourth example embodiment) of the present disclosure will be described. Since the touch panel of the display device according to an example embodiment of the present disclosure and the touch panel of the display device according to still another example embodiment (the fourth example embodiment) of the present disclosure differ only in terms of a shape of a second sub-unit pattern and a sub-connection pattern, only these differences will be described. In addition, redundant contents of the touch panel of the display device according to an example embodiment of the present disclosure and the display device according to still another example embodiment (the fourth example embodiment) of the present disclosure are omitted, and the same reference numerals are used for the same components.

Figure 13A:
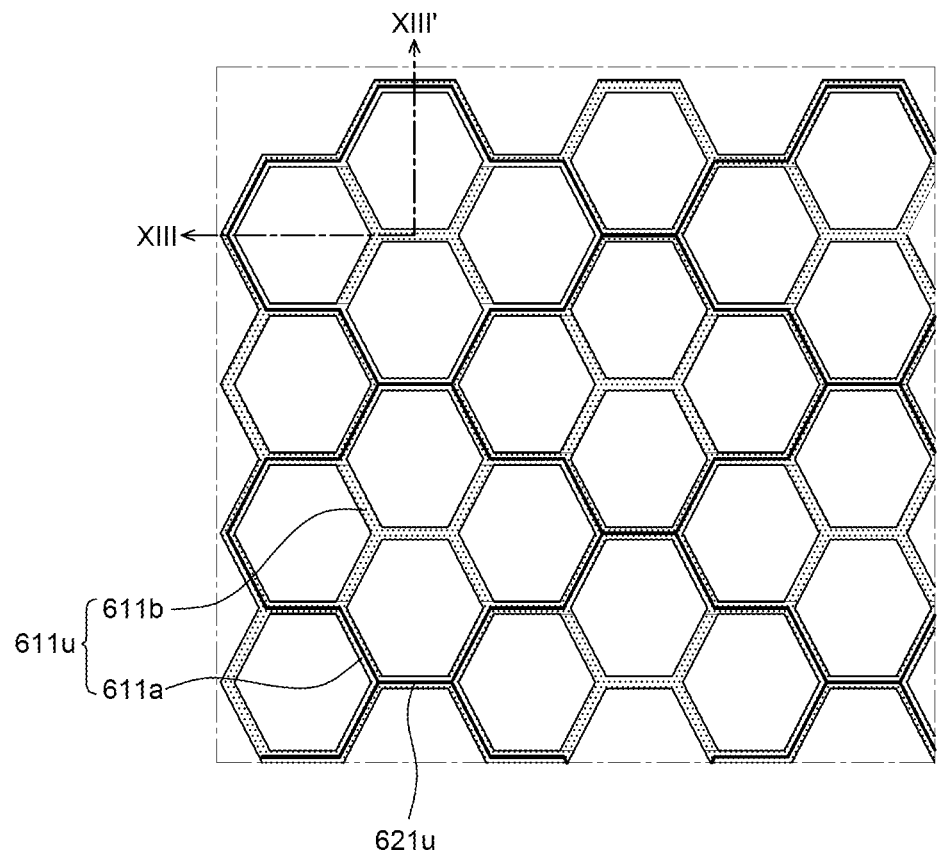
FIG. 13A is an enlarged plan view of a touch panel of a display device according to still another example embodiment (a fourth example embodiment) of the present disclosure.

FIG. 13A is an enlarged plan view of a touch panel of a display device according to still another example embodiment (the fourth example embodiment) of the present disclosure.

Figure 13B:
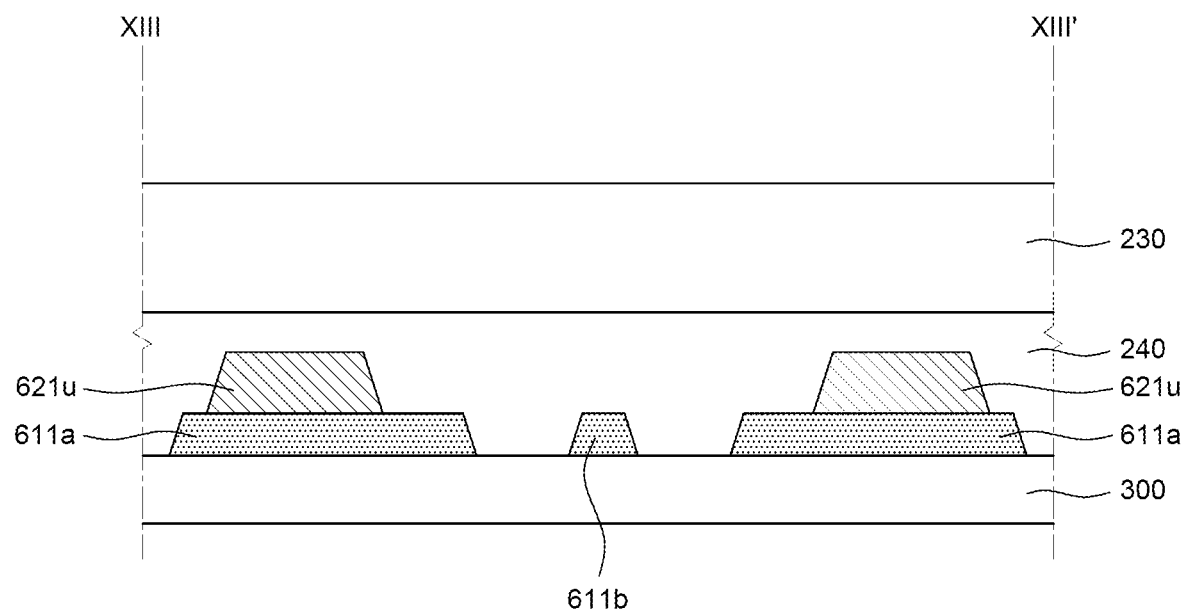
FIG. 13B is a cross-sectional view taken along cutting line XIII-XIII' illustrated in FIG. 13A.

FIG. 13B is a cross-sectional view taken along cutting line XIII-XIII' illustrated in FIG. 13A.

Each of a plurality of stretching patterns may include a plurality of unit patterns 611u. Specifically, as illustrated in FIGS. 13A and 13B, each of the plurality of unit patterns 611u constituting each of the plurality of stretching patterns may include a first sub-unit pattern 611a and a second sub-unit pattern 611b disposed inside the first sub-unit pattern 611a.

For example, as illustrated in FIG. 13A, the first sub-unit pattern 611a may have a cross shape (+). However, the present disclosure is not limited thereto, and the first sub-unit pattern 611a may be deformed into a polygonal shape such as an octagonal shape or a circular shape.

In addition, the second sub-unit pattern 611b may have an X-shape (X). Specifically, four ends of the second sub-unit pattern 611b of the X-shape (X) may be connected to an inside of the first sub-unit pattern 611a.

In addition, the unit patterns 611u including the first sub-unit patterns 611a and the second sub-unit patterns 611b may have a honeycomb shape. That is, the unit patterns 611u may have a hexagonal mesh shape.

Accordingly, an empty space exists between the first sub-unit pattern 611a and the second sub-unit pattern 611b within each of the plurality of unit patterns 611u, so that each of the plurality of unit patterns 611u may expand and contract in the first direction X and the second direction Y. Accordingly, each of the plurality of stretching patterns including the plurality of unit patterns 611u may also extend in the first direction X and the second direction Y.

In addition, each of the plurality of unit electrodes 621u may be disposed on the first sub-unit pattern 611a. That is, each of the plurality of unit electrodes 621u may overlap the first sub-unit pattern 611a.

Accordingly, an empty space exists within each of the plurality of unit electrodes 621u, so that each of the plurality of unit electrodes 621u may expand and contract in the first direction X and the second direction Y. Accordingly, the plurality of touch electrodes including the plurality of unit electrodes 621u may also extend in the first direction X and the second direction Y.

As described above, the touch panel of the display device according to still another example embodiment (the fourth example embodiment) of the present disclosure may also allow a stretchable touch electrode to be disposed on a stretchable touch pattern layer. Accordingly, stretching reliability of the touch panel of the display device according to still another example embodiment (the fourth example embodiment) of the present disclosure may be improved.

Also, as illustrated in FIG. 13B, in the touch panel of the display device according to still another example embodiment (the fourth example embodiment) of the present disclosure, the second sub-unit pattern 611b may be further disposed between the second filling layer 240 and the glass substrate. Accordingly, an area in which the second filling layer 240 and the glass substrate contact may be relatively narrowed, and thus, laser lift off (LLO) process efficiency for the touch panel may be increased.

Hereinafter, a touch panel of a display device according to still another example embodiment (a fifth example embodiment) of the present disclosure will be described. Since the touch panel of the display device according to an example embodiment of the present disclosure and the touch panel of the display device according to still another example embodiment (the fifth example embodiment) of the present disclosure differ only in terms of a touch pattern layer and a touch electrode layer, only these differences will be described. In addition, redundant contents of the touch panel of the display device according to an example embodiment of the present disclosure and the display device according to still another example embodiment (the fifth example embodiment) of the present disclosure are omitted, and the same reference numerals are used for the same components.

Figure 14A:
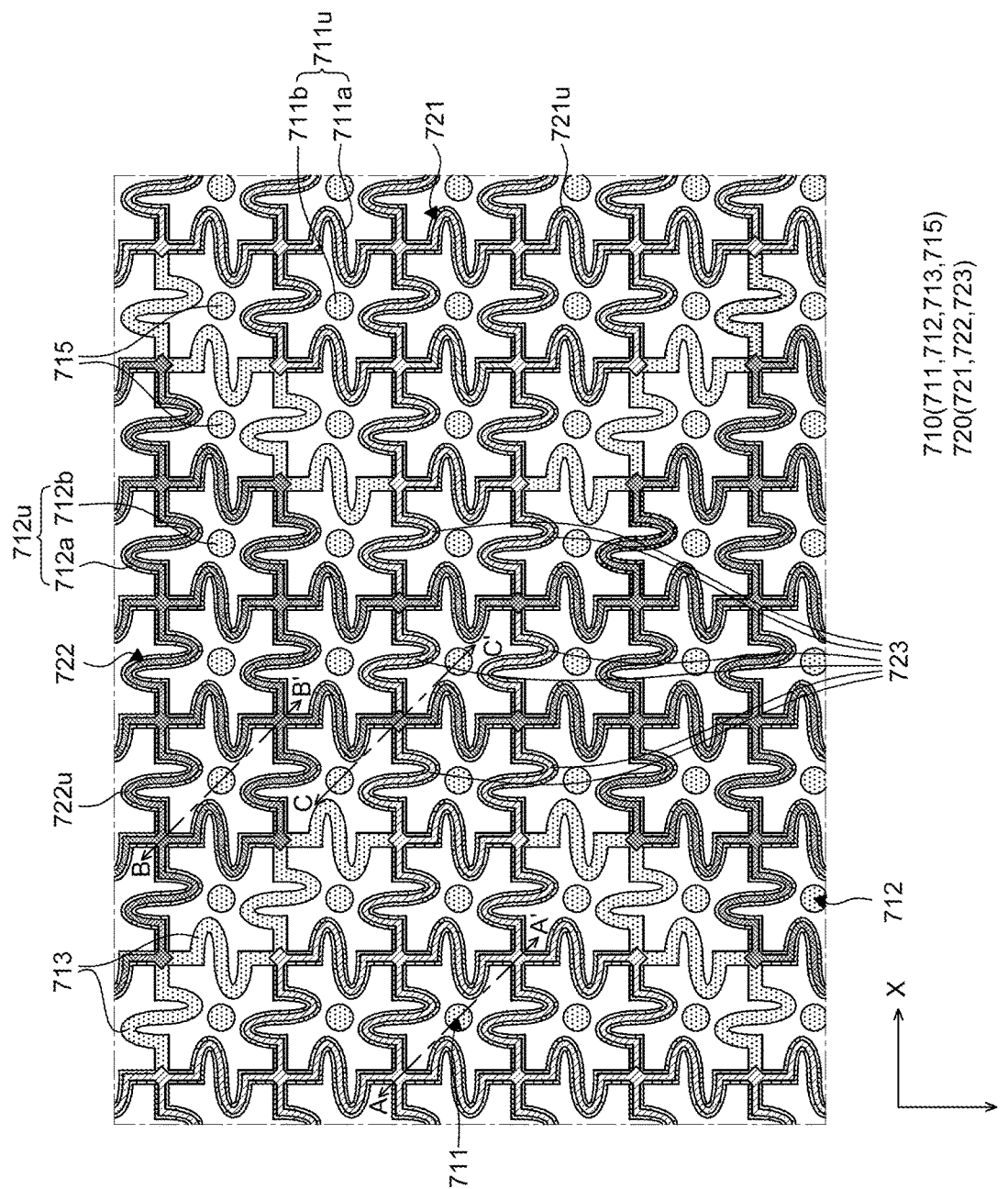
FIG. 14A is an enlarged plan view of a touch panel of a display device according to still another example embodiment (a fifth example embodiment) of the present disclosure.

FIG. 14A is an enlarged plan view of the touch panel of the display device according to still another example embodiment (the fifth example embodiment) of the present disclosure.

Figure 14B:
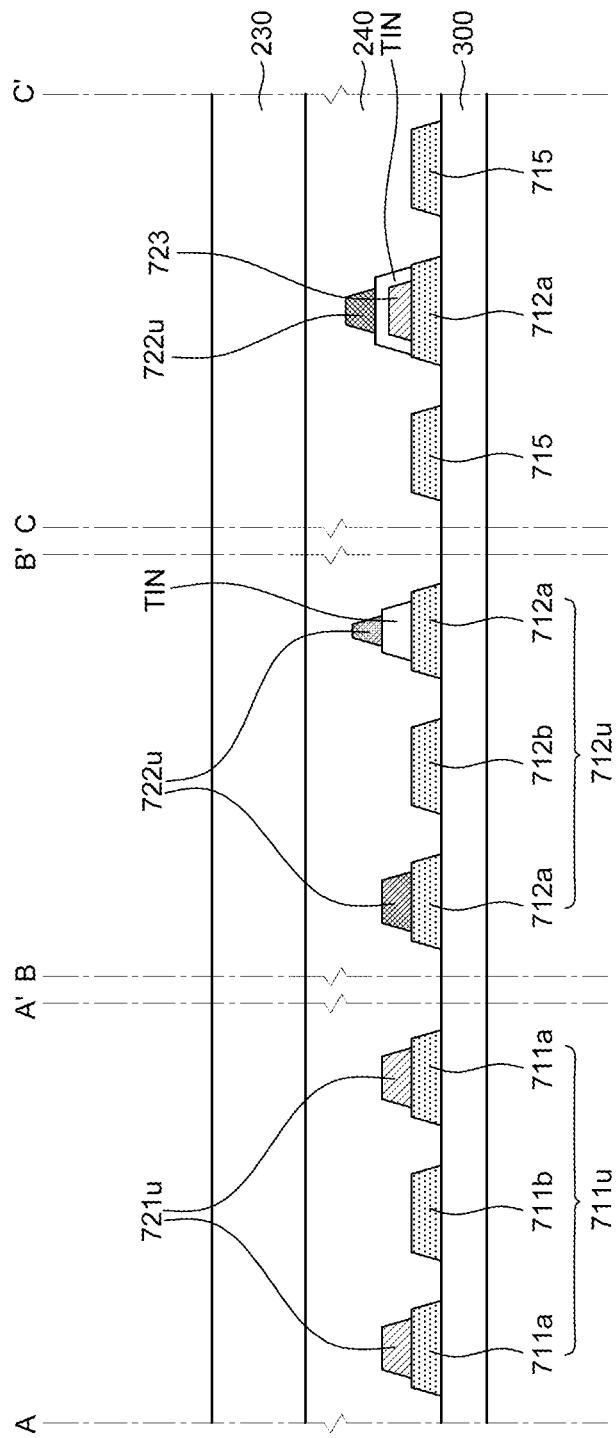
FIG. 14B is a cross-sectional view taken along cutting line A-A', cutting line B-B' and cutting line C-C' illustrated in FIG. 14A.

FIG. 14B is a cross-sectional view taken along cutting line A-A', cutting line B-B' and cutting line C-C' illustrated in FIG. 14A.

Referring to FIG. 14A, a touch pattern layer 710 includes a plurality of stretching patterns 711 and 712, and each of the plurality of stretching patterns 711 and 712 includes a plurality of unit patterns 711u and 712u. Specifically, the plurality of stretching patterns 711 and 712 include first stretching patterns 711 on which first touch electrodes 721 are disposed and second stretching patterns 712 on which second touch electrodes 722 are disposed. The first stretching pattern 711 includes a plurality of first unit patterns 711*u*, and the second stretching pattern 712 includes a plurality of second unit patterns 712*u*.

Each of the plurality of first unit patterns 711*u* constituting the first stretching pattern 711 may include a first sub-unit pattern 711*a* and a second sub-unit pattern 711*b* disposed inside the first sub-unit pattern 711*a*.

For example, as illustrated in FIG. 14A, the first sub-unit pattern 711*a* may have a quadrangular shape having four wavy sides. For example, the first sub-unit pattern 711*a* may be formed in a quadrangular shape by connecting four patterns having a sinusoidal wave shape to each other so as to have four vertices. However, the present disclosure is not limited thereto, and the first sub-unit pattern 711*a* may be deformed into a polygonal shape such as an octagonal shape or a circular shape.

In addition, the second sub-unit pattern 711*b* may have a circular shape having a size smaller than that of the first sub-unit pattern 711*a*. However, the present disclosure is not limited thereto, and the second sub-unit pattern 711*b* may also be deformed into a polygonal shape such as a quadrangle. In addition, although it is illustrated in FIG. 14A that no empty space exists inside the second sub-unit pattern 711*b*, an empty space may exist inside the second sub-unit pattern 711*b*, but is not limited thereto.

The plurality of second unit patterns 712*u* constituting the second stretching pattern 712 may have substantially the same structure as the plurality of first unit patterns 711*u*. Each of the plurality of second unit patterns 712*u* may include a third sub-unit pattern 712*a* and a fourth sub-unit pattern 712*b* disposed inside the third sub-unit pattern 712*a*.

The third sub-unit pattern 712*a* has the same structure as the first sub-unit pattern 711*a*, and may have a quadrangular shape having four wavy sides. For example, the third sub-unit pattern 712*a* may have a quadrangular shape by connecting four patterns having a sinusoidal wave shape to each other to have four vertices. However, the present disclosure is not limited thereto, and the third sub-unit pattern 712*a* may be deformed into a polygonal shape such as an octagonal shape or a circular shape.

The fourth sub-unit pattern 712*b* has the same structure as the second sub-unit pattern 711*b*, and may be a circular shape having a size smaller than that of the third sub-unit pattern 712*a*. However, the present disclosure is not limited thereto, and the fourth sub-unit pattern 712*b* may also be deformed into a polygon shape such as a quadrangle. In addition, although it is illustrated that no empty space exists inside the fourth sub-unit pattern 712*b* in FIG. 14A, an empty space may exist inside the fourth sub-unit pattern 712*b*, but is not limited thereto.

Accordingly, each of the plurality of unit patterns 711*u* and 712*u* has an empty space therein, so that each of the plurality of unit patterns 711*u* and 712*u* may expand and contract in the first direction X and the second direction Y.

In addition, the touch pattern layer 710 may include first connection patterns 713 connecting the plurality of stretching patterns 711 and 712 disposed in the first direction X. Meanwhile, although not illustrated in FIG. 14A, a second connection pattern connecting the plurality of first stretching patterns 711 adjacent in the second direction Y may be disposed as illustrated in FIG. 8.

The touch pattern layer 710 may further include a plurality of island patterns 715 disposed between the plurality of stretching patterns 711 and 712. The plurality of island patterns 715 may be disposed in an area between the first stretching pattern 711 and the second stretching pattern 712. The island patterns 715 may be disposed in a space between the first stretching pattern 711 and the first connection pattern 713 and in a space between the first connection pattern 713 and the second stretching pattern 712. The island pattern 715 may have a circular shape, but is not limited thereto, and may be deformed into a polygonal shape such as a quadrangle. In addition, although it is illustrated that there is no empty space inside the island pattern 715 in FIG. 14A, an empty space may exist inside the island pattern 715, but the present disclosure is not limited thereto.

Meanwhile, the first connection pattern 713, the island pattern 715, the second sub-unit pattern 711*b*, and the fourth sub-unit pattern 712*b* on which a touch electrode layer 720 is not disposed may be patterns for a reduction in a contact area between the second filling layer 240 and the glass substrate. Accordingly, the first connection pattern 713, the island pattern 715, the second sub-unit pattern 711*b*, and the fourth sub-unit pattern 712*b* are additionally disposed in a remaining area where the touch electrode layer 720 is not disposed, so that the contact area between the second filling layer 240 and the glass substrate may be reduced, and laser lift off (LLO) process efficiency for the touch panel may be increased.

Referring to FIGS. 14A and 14B, each of a plurality of the touch electrodes 721 and 722 may include a plurality of unit electrodes 721*u* and 722*u*. For example, the first touch electrode 721 may include a plurality of first unit electrodes 721*u*. In addition, the second touch electrode 722 may include a plurality of second unit electrodes 722*u*. The plurality of unit electrodes 721*u* and 722*u* may be disposed on the first sub-unit pattern 711*a* and the third sub-unit pattern 712*a*, respectively, that is, the plurality of unit electrodes 721*u* and 722*u* may overlap the first sub-unit pattern 711*a* and the third sub-unit pattern 712*a*, respectively.

Accordingly, an empty space exists inside each of the plurality of unit electrodes 721*u* and 722*u*, and the plurality of unit electrodes 721*u* and 722*u* may expand and contract in the first direction X and the second direction Y. Accordingly, the first touch electrode 721 including the plurality of first unit electrodes 721*u* and the second touch electrode 722 including the plurality of second unit electrodes 722*u* may also extend in the first direction X and the second direction Y.

Referring to FIG. 14B, the plurality of first touch electrodes 721 adjacent in the first direction X may be connected to each other through bridge lines 723. The bridge lines 723 extending in the first direction X may be disposed on the first connection patterns 713 and the second stretching patterns 712 to electrically connect the first touch electrodes 721 adjacent to each other. For example, the bridge lines 723 may be disposed on the first connection pattern 713 connecting the first stretching pattern 711 and the second stretching pattern 712, and the second stretching pattern 712 disposed between the first connection pattern 713 and the first connection pattern 713.

The bridge lines 723 may be disposed on the same layer as the plurality of first touch electrodes 721. Accordingly, the bridge lines 723 and the plurality of first touch electrodes 721 may be integrally formed and electrically connected to each other.

In addition, a majority of the plurality of second touch electrodes 722 may be disposed on the same layer as the plurality of first touch electrodes 721 and the bridge lines 723. However, since the bridge lines 723 extending in the first direction X and the second touch electrodes 722 extending in the second direction Y are disposed to cross each other, some second touch electrodes 722 adjacent to the bridge lines 723 among the plurality of second touch electrodes 722 may be disposed on a layer different from those of the plurality of first touch electrodes 721 and the bridge lines 723 and may be insulated from the plurality of first touch electrodes 721 and the bridge lines 723.

For example, referring to FIG. 14B, in an area where the bridge line 723 is disposed and in an area adjacent to the bridge line 723, a touch insulating layer TIN may be formed on the touch pattern layer 710 and the bridge line 723, and the second touch electrode 722 may be disposed on the touch insulating layer TIN. Accordingly, the first touch electrode 721 and the second touch electrode 722 to which different signals are applied may be insulated by the touch insulating layer TIN disposed between the second touch electrode 722 and the bridge line 723.

Meanwhile, in FIG. 14B, the touch insulating layer TIN is illustrated as being disposed in an area overlapping the bridge line 723 and on one second stretching pattern 712 that is most adjacent to the bridge line 723, but an area of the second stretching pattern 712 on which the touch insulating layer TIN is disposed may be greater, but is not limited thereto.

Arrangement structures of the bridge lines 723 and the plurality of touch electrodes 721 and 722 of the display device according to still another example embodiment (the fifth example embodiment) of the present disclosure described with reference to FIGS. 14A and 14B may also be applied to the touch panel of the display device according to an example embodiment of the present disclosure in FIGS. 8 and 9B, the touch panel of the display device according to another example embodiment of the present disclosure in FIGS. 11A and 111B, the touch panel of the display device according to still another example embodiment (the third example embodiment) of the present disclosure in FIGS. 12A and 12B, and the touch panel of the display device according to still another example embodiment (the fourth example embodiment) of the present disclosure in FIGS. 13A and 13B.

Hereinafter, a method of manufacturing the touch panel of the display device according to still another example embodiment (the fifth example embodiment) of the present disclosure will be described.

FIGS. 15A to 15E are process views for explaining a method of manufacturing the touch panel of the display device according to still another example embodiment (the fifth example embodiment) of the present disclosure.

Figure 15A:
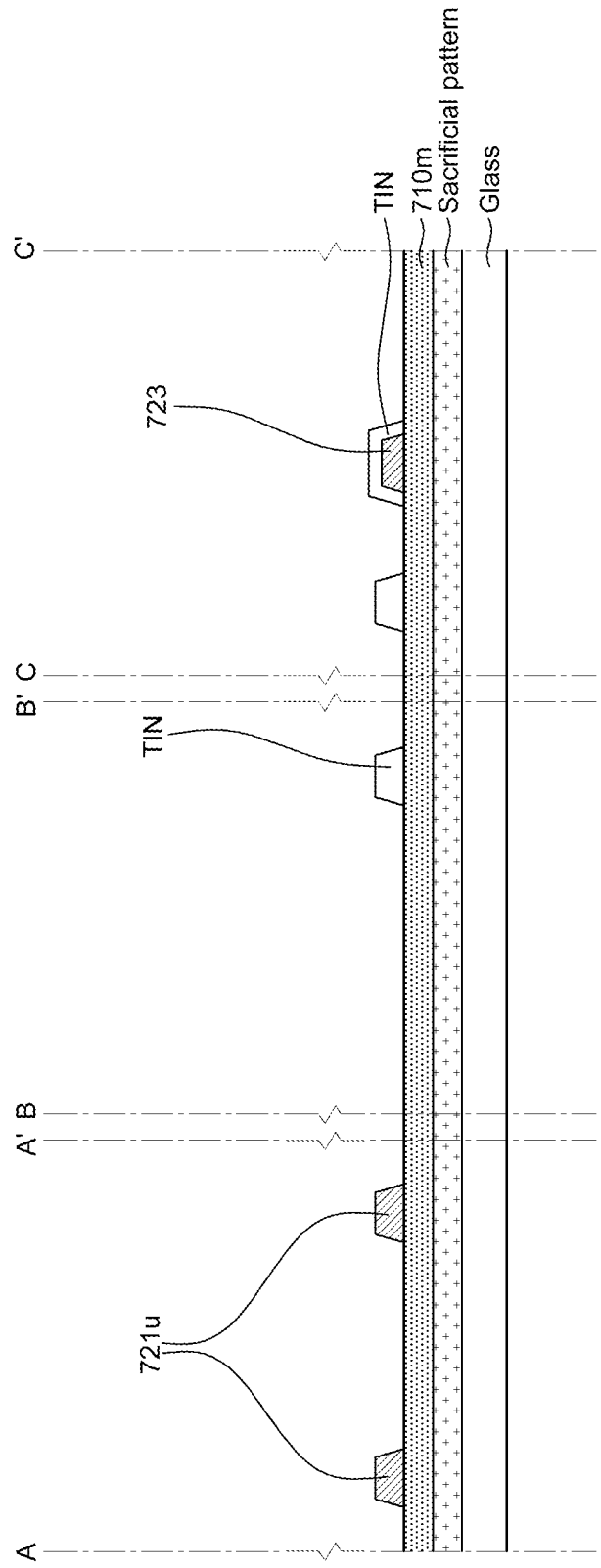
FIGS. 15A to 15E are process views for explaining a method of manufacturing the touch panel of the display device according to still another example embodiment (the fifth example embodiment) of the present disclosure.

Referring to FIG. 15A, a sacrificial pattern and a pattern material layer 710m are formed on a glass substrate (glass). The pattern material layer 710m may be etched in a subsequent process to form the touch pattern layer 710.

In addition, the plurality of first unit electrodes 721u of the plurality of first touch electrodes 721 and the bridge line 723 are formed on the pattern material layer 710m. A metal layer may be formed on the pattern material layer 710m, and the metal layer may be etched to form the plurality of first unit electrodes 721u and the bridge line 723 together.

Next, the touch insulating layer TIN is formed on the plurality of first touch electrodes 721 and the bridge line 723. The touch insulating layer TIN may be formed to cover at least the bridge line 723. Also, the touch insulating layer TIN may be formed in an area adjacent to the bridge line 723 among areas where the second touch electrode 722 is to be formed.

Figure 15B:
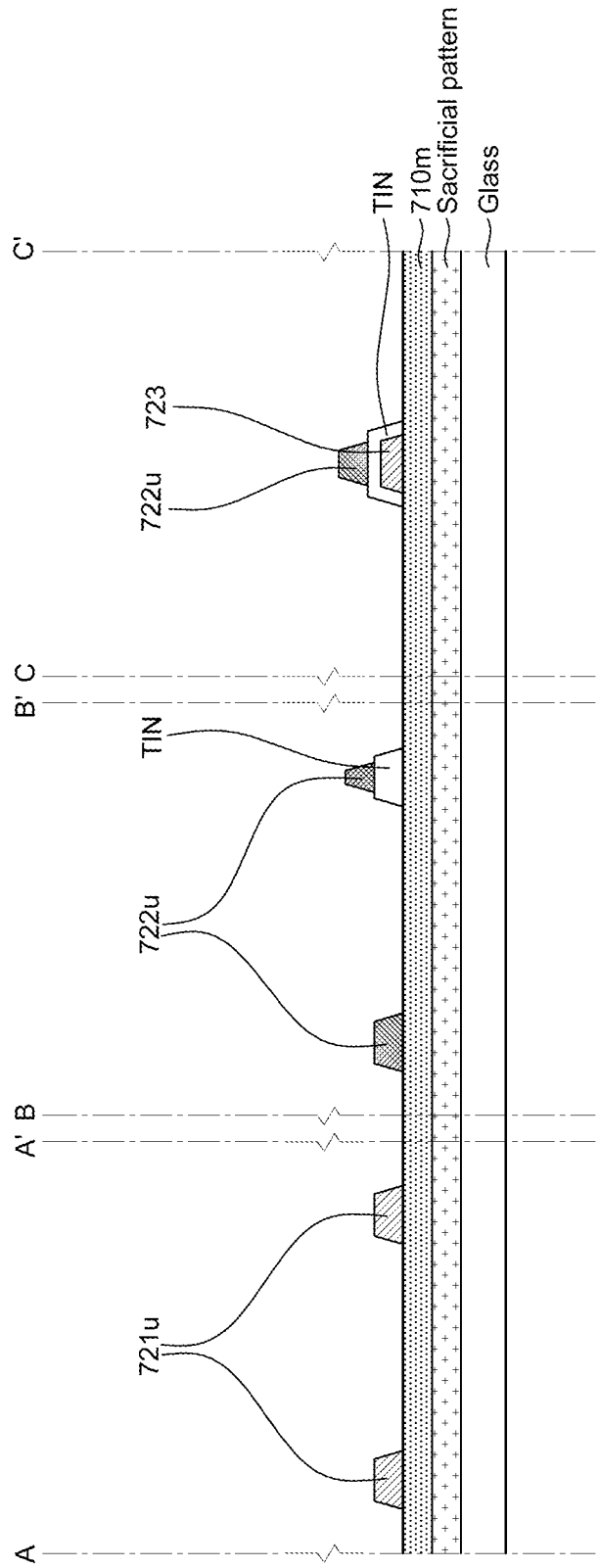

Subsequently, referring to FIG. 15B, a plurality of the second touch electrodes 722 including the plurality of second unit electrodes 722u are formed on the touch insulating layer TIN and the pattern material layer 710m. In an area relatively far from the bridge line 723, the second unit electrode 722u may be formed on the pattern material layer 710m, and in an area relatively adjacent to the bridge line 723, the second unit electrode 722u may be formed on the touch insulating layer TIN. In addition, a portion of the second unit electrodes 722u, which is formed to overlap the bridge line 723 may be formed on the touch insulating layer TIN and insulated from the bridge line 723.

Figure 15C:
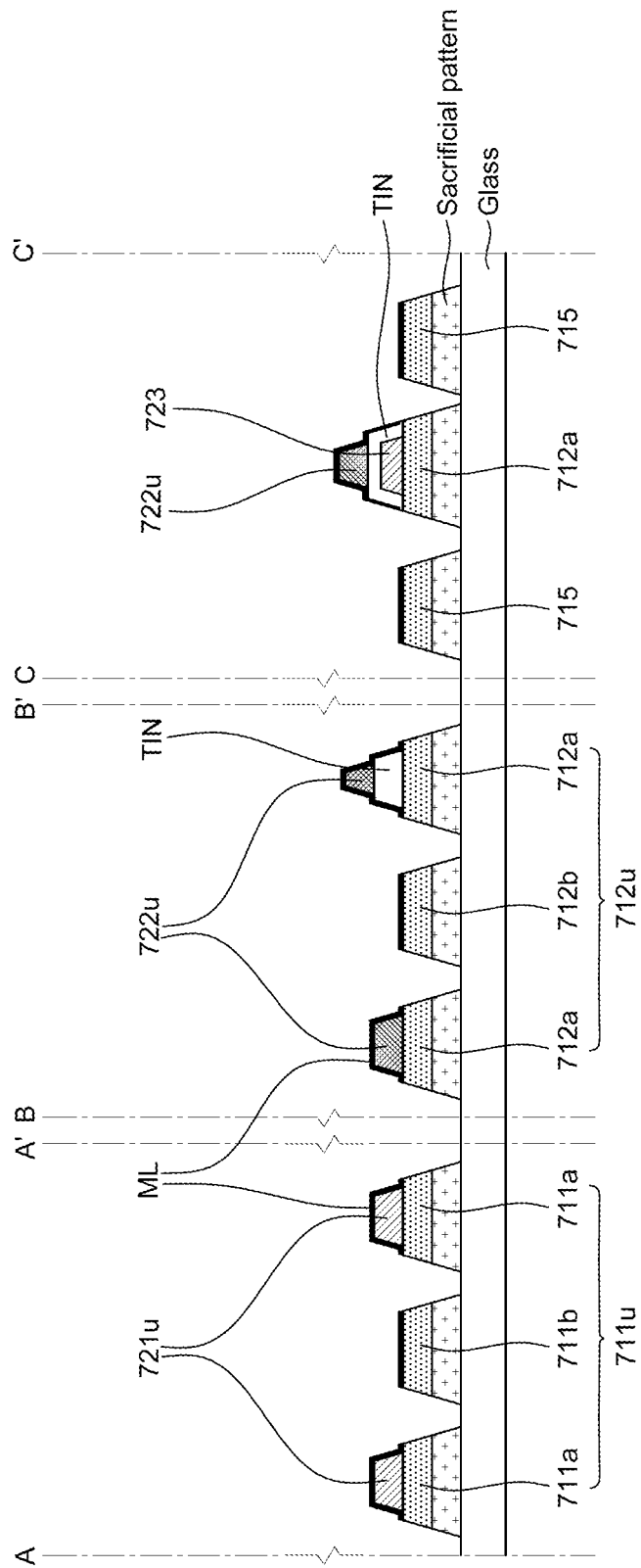

Subsequently, referring to FIG. 15C, a masking layer ML is formed on the touch electrode layer 720 including the first touch electrode 721, the second touch electrode 722, and the bridge line 723, and the pattern material layer 710m is etched using the masking layer ML. For example, the touch pattern layer 710 may be formed by etching a portion of the pattern material layer 710m in which the masking layer ML is not formed through a dry etching process. The masking layer ML may be formed of an oxide layer such as indium tin oxide (ITO), but is not limited thereto.

Figure 15D:
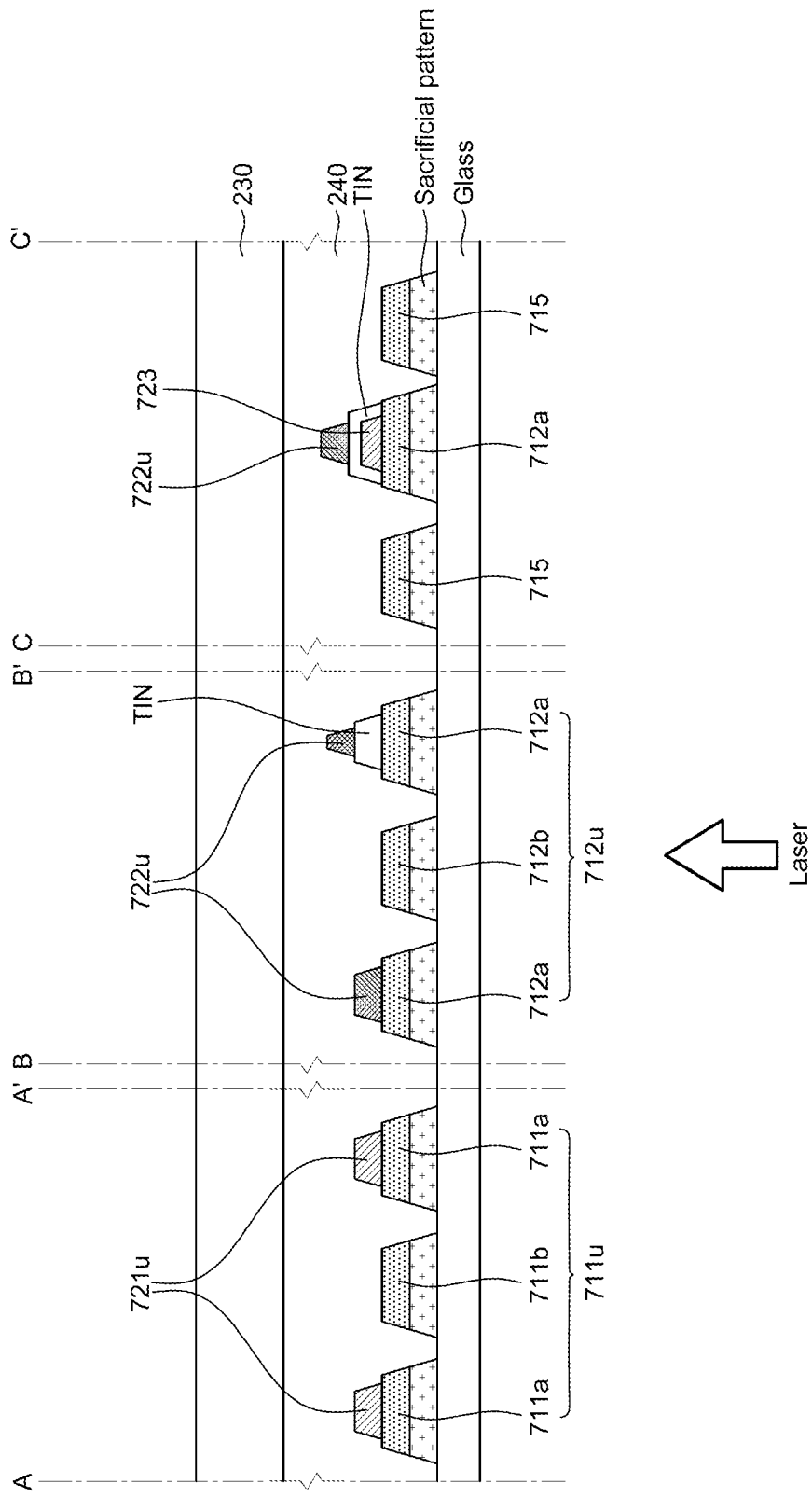

Subsequently, referring to FIG. 15D, the masking layer ML is removed, and the second filling layer 240 and the touch substrate 230 are formed on the touch pattern layer 710 and the touch electrode layer 720. The second filling layer 240 may come into contact with the touch pattern layer 710, the touch electrode layer 720, the sacrificial pattern, and the glass substrate, and the touch substrate 230 may cover an entire surface of the second filling layer 240.

Figure 15E:
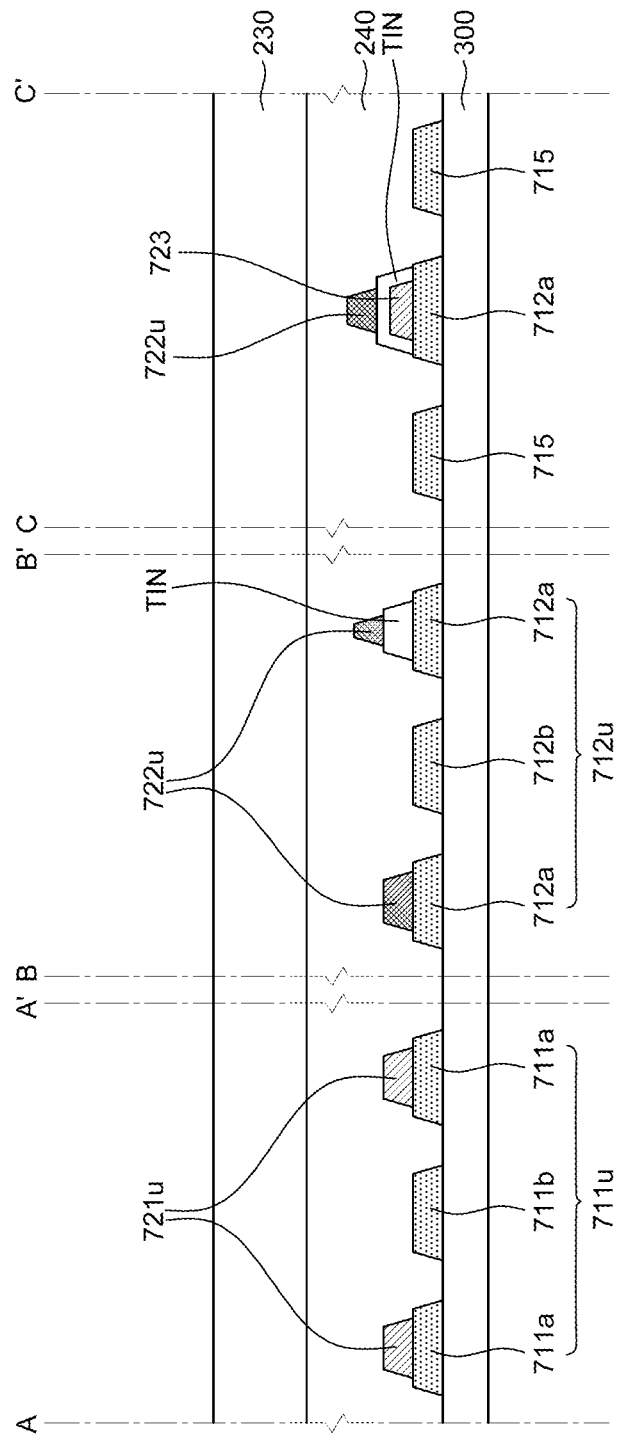

Finally, referring to FIG. 15E, a laser lift off (LLO) process of separating the glass substrate and the sacrificial pattern by irradiating a laser onto a lower portion of the glass substrate is performed. The touch pattern layer 710 and the touch electrode layer 720 separated from the glass substrate may be attached to the display panel to thereby form a display device.

At this time, the second sub-unit pattern 711b, the fourth sub-unit pattern 712b, the first connection pattern 713, and the island pattern 715 and the like are disposed between the glass substrate and the second filling layer 240, so that the contact area between the glass substrate and the second filling layer 240 may be reduced. Accordingly, the contact area between the second filling layer 240 and the glass substrate may be reduced, and laser lift off (LLO) process efficiency for the touch panel may be increased.

In the touch panel of the display device according to still another example embodiment (the fifth example embodiment) of the present disclosure, the first touch electrode 721 and the bridge line 723 may be formed on the same layer. In addition, while the second touch electrode 722 is formed on the first touch electrode 721 and the bridge line 723, the touch insulating layer TIN is formed in an area where the second touch electrode 722 and the bridge line 723 cross each other, so that the second touch electrode 722, and the bridge line 723 and the first touch electrode 721 may be insulated from each other. Accordingly, a touch input may be sensed by applying different signals to each of the plurality of first touch electrodes 721 and the plurality of second touch electrodes 722.

Hereinafter, a touch panel of a display device according to still another example embodiment (a sixth example embodiment) of the present disclosure will be described. Since the touch panel of the display device according to still another example embodiment (the fifth example embodiment) of the present disclosure and the touch panel of the display device according to still another example embodiment (the sixth example embodiment) of the present disclosure differ only in terms of first touch electrodes, second touch electrodes, and bridge lines, only these differences will be described. In addition, redundant contents of the touch panel of the display device according to still another example embodiment (the fifth example embodiment) of the present disclosure and the display device according to still another example embodiment (the sixth example embodiment) of the present disclosure are omitted, and the same reference numerals are used for the same components.

Figure 16A:
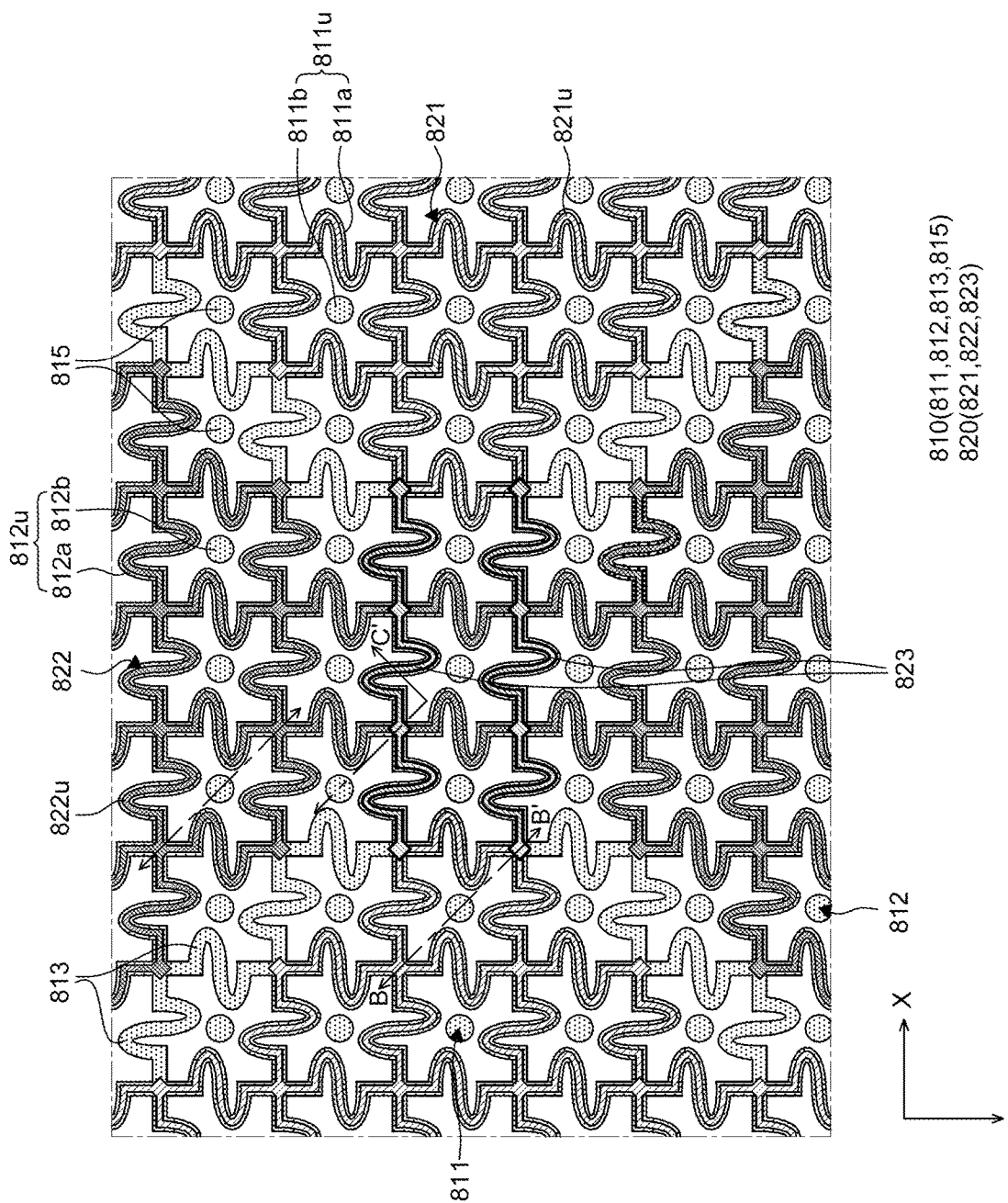
FIG. 16A is an enlarged plan view of a touch panel of a display device according to still another example embodiment (a sixth example embodiment) of the present disclosure.

FIG. 16A is an enlarged plan view of the touch panel of the display device according to still another example embodiment (the sixth example embodiment) of the present disclosure.

Figure 16B:
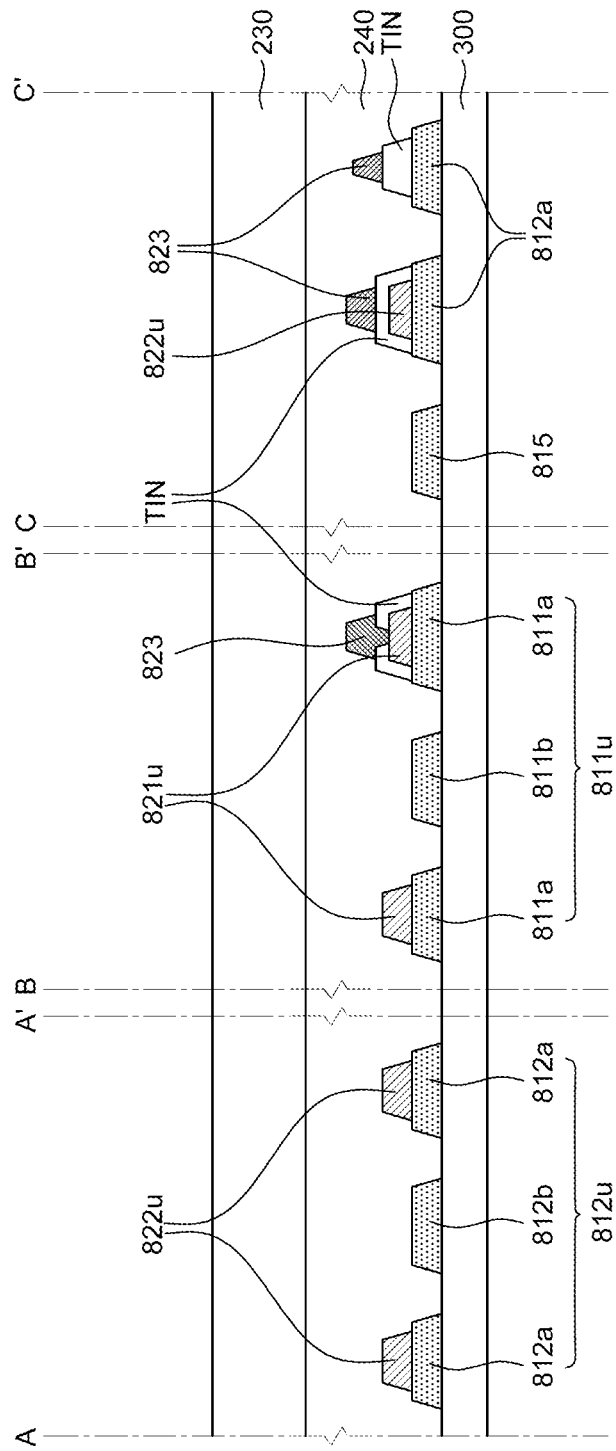
FIG. 16B is a cross-sectional view taken along cutting line A-A', cutting line B-B' and cutting line C-C' illustrated in FIG. 16A.

FIG. 16B is a cross-sectional view taken along cutting line A-A', cutting line B-B' and cutting line C-C' illustrated in FIG. 16A.

Referring to FIGS. 16A and 16B, a touch pattern layer 810 includes a plurality of stretching patterns 811 and 812, and each of the plurality of stretching patterns 811 and 812 may include a plurality of unit patterns 811u and 812u. Specifically, the plurality of stretching patterns 811 and 812 may include first stretching patterns 811 on which first touch electrodes 821 are disposed and second stretching patterns 812 on which second touch electrodes 822 are disposed. The first stretching pattern 811 includes a plurality of first unit patterns 811u, and the second stretching pattern 812 includes a plurality of second unit patterns 812u.

Each of the plurality of first unit patterns 811u constituting the first stretching pattern 811 may include a first sub-unit pattern 811a and a second sub-unit pattern 811b disposed inside the first sub-unit pattern 811a.

For example, as illustrated in FIG. 16A, the first sub-unit pattern 811a may have a quadrangular shape having four wavy sides. For example, the first sub-unit pattern 811a may have a quadrangular shape by connecting four patterns having a sinusoidal wave shape to each other so as to have four vertices. However, the present disclosure is not limited thereto, and the first sub-unit pattern 811a may be deformed into a polygonal shape such as an octagonal shape or a circular shape.

In addition, the second sub-unit pattern 811b may have a circular shape having a size smaller than that of the first sub-unit pattern 811a. However, the present disclosure is not limited thereto, and the second sub-unit pattern 811b may also be deformed into a polygonal shape such as a quadrangle. In addition, although it is illustrated in FIG. 16A that no empty space exists inside the second sub-unit pattern 811b, an empty space may exist inside the second sub-unit pattern 811b, but the present disclosure is not limited thereto.

The plurality of second unit patterns 812u constituting the second stretching pattern 812 may have substantially the same structure as the plurality of first unit patterns 811u. Each of the plurality of second unit patterns 812u may include a third sub-unit pattern 812a and a fourth sub-unit pattern 812b disposed inside the third sub-unit pattern 812a.

The third sub-unit pattern 812a has the same structure as the first sub-unit pattern 811a, and may have a quadrangular shape having four wavy sides. For example, the third sub-unit pattern 812a may have a quadrangular shape by connecting four patterns having a sinusoidal wave shape to each other so as to have four vertices. However, the present disclosure is not limited thereto and the third sub-unit pattern 812a may be deformed into a polygonal shape such as an octagonal shape or a circular shape.

The fourth sub-unit pattern 812b has the same structure as the second sub-unit pattern 811b, and may be a circular shape having a size smaller than that of the third sub-unit pattern 812a. However, the present disclosure is not limited thereto, and the fourth sub-unit pattern 812b may also be deformed into a polygonal shape such as a quadrangle. In addition, although it is illustrated that no empty space exists inside the fourth sub-unit pattern 812b in FIG. 16A, an empty space may exist inside the fourth sub-unit pattern 812b, but the present disclosure is not limited thereto.

Accordingly, each of the plurality of unit patterns 811u and 812u has an empty space therein, so that each of the plurality of unit patterns 811u and 812u may expand and contract in the first direction X and the second direction Y.

In addition, the touch pattern layer 810 may include first connection patterns 813 connecting the plurality of stretching patterns 811 and 812 disposed in the first direction X. Meanwhile, although not illustrated in FIG. 16A, a second connection pattern connecting a plurality of the first stretching patterns 811 adjacent in the second direction Y may be disposed as illustrated in FIG. 8.

The touch pattern layer 810 may further include a plurality of island patterns 815 disposed between the plurality of stretching patterns 811 and 812. The plurality of island patterns 815 may be disposed in an area between the first stretching pattern 811 and the second stretching pattern 812. The island patterns 815 may be disposed in a space between the first stretching pattern 811 and the first connection pattern 813 and in a space between the first connection pattern 813 and the second stretching pattern 812. The island pattern 815 may have a circular shape, but is not limited thereto, and may be deformed into a polygonal shape such as a quadrangle. In addition, although it is illustrated in FIG. 16A that an empty space does not exist in the island pattern 815, an empty space may exist in the island pattern 815 but is not limited thereto.

Meanwhile, the first connection pattern 813, the island pattern 815, the second sub-unit pattern 811b, and the fourth sub-unit pattern 812b on which a touch electrode layer 720 is not disposed are patterns for a reduction in an area in which the second filling layer 240 and the glass substrate are in contact when the touch panel is manufactured. Accordingly, the first connection pattern 813, the island pattern 815, the second sub-unit pattern 811b, and the fourth sub-unit pattern 812b are additionally disposed in a remaining area where the touch electrode layer 820 is not disposed, so that a contact area between the second filling layer 240 and the glass substrate may be reduced, and laser lift off (LLO) process efficiency for the touch panel may be increased.

Referring to FIGS. 16A and 16B, a plurality of the touch electrodes 821 and 822 are disposed on a plurality of the first stretching patterns 811 and a plurality of the second stretching patterns 812. Each of the plurality of touch electrodes 821 and 822 may include a plurality of unit electrodes 821u and 822u. For example, the first touch electrode 821 may include the plurality of first unit electrodes 821u. In addition, the second touch electrode 822 may include the plurality of second unit electrodes 822u. The plurality of unit electrodes 821u and 822u may be disposed on the first sub-unit pattern 811a and the third sub-unit pattern 812a, respectively, that is, the plurality of unit electrodes 821u and 822u may overlap the first sub-unit pattern 811a and the third sub-unit pattern 812a, respectively.

Accordingly, an empty space exists inside each of the plurality of unit electrodes 821u and 822u, and the plurality of unit electrodes 821u and 822u may expand and contract in the first direction X and the second direction Y. Accordingly, the first touch electrode 821 including the plurality of first unit electrodes 821u and the second touch electrode 822 including the plurality of second unit electrodes 822u may also extend in the first direction X and the second direction Y.

Referring to FIG. 16B, the plurality of first touch electrodes 821 adjacent in the first direction X may be connected to each other through bridge lines 823. The bridge lines 823 extending in the first direction X may be disposed on the first connection patterns 813 and the second stretching patterns 812 to electrically connect the first touch electrodes 821 adjacent to each other. For example, the bridge lines 823 may be disposed on the first connection pattern 813 connecting the first stretching pattern 811 and the second stretching pattern 812, and the second stretching pattern 812 disposed between the first connection pattern 813 and the first connection pattern 813.

The plurality of first touch electrodes 821 and the plurality of second touch electrodes 822 may be disposed on the same layer, and the bridge line 823 may be disposed on a layer different from those of the plurality of first touch electrodes 821 and the plurality of second touch electrodes 822. At least a portion of each of the plurality of second touch electrodes 822 formed on the same layer may be integrally formed and connected to each other. In addition, each of the plurality of first touch electrodes 821 may be connected to the touch electrode 821 adjacent thereto in the first direction X and receive a touch driving signal applied thereto. However, since the second touch electrode 822 is disposed between the plurality of respective first touch electrodes 821 in the first direction X, at least a portion of the first touch electrodes 821 may not be integrally formed and connected to each other, and may be electrically connected to each other through a separate bridge line 823.

In this case, the bridge lines 823 extending in the first direction X and electrically connecting the first touch electrodes 821 adjacent to each other in the first direction X may be disposed to cross the second touch electrodes 822 extending in the second direction Y. In addition, a touch insulating layer TIN is formed on some second touch electrodes 822 that are adjacent to the bridge lines 823 among the plurality of second touch electrodes 822, so that the plurality of second touch electrodes 822 and the bridge lines 823 may be insulated from each other.

For example, referring to FIG. 16B, in an area where the bridge line 823 is disposed and in an area adjacent to the area where the bridge line 823 is disposed, touch insulating layers TIN may be disposed on the touch pattern layer 810 and the plurality of touch electrodes 821 and 822, and the bridge lines 823 may be disposed on the touch insulating layers TIN. Accordingly, the first touch electrode 821 and the second touch electrode 822 to which different signals are applied may be insulated by the touch insulating layer TIN disposed between the second touch electrode 822 and the bridge line 823.

Meanwhile, in FIG. 16B, the touch insulating layer TIN is illustrated as being disposed in an area overlapping the bridge line 823, but areas of the plurality of stretching patterns 811 and 812 in which the touch insulating layers TIN are disposed may be greater, and the present disclosure is not limited thereto.

Arrangement structures of the bridge lines 823 and the plurality of touch electrodes 821 and 822 of the display device according to still another example embodiment (the sixth example embodiment) of the present disclosure described with reference to FIGS. 16A and 16B may also be applied to the touch panel of the display device according to an example embodiment of the present disclosure in FIGS. 8 and 9B, the touch panel of the display device according to another example embodiment of the present disclosure in FIGS. 11A and 11B, the touch panel of the display device according to still another example embodiment (the third example embodiment) of the present disclosure in FIGS. 12A and 12B, and the touch panel of the display device according to still another example embodiment (the fourth example embodiment) of the present disclosure in FIGS. 13A and 13B.

Hereinafter, a method of manufacturing the touch panel of the display device according to still another example embodiment (the sixth example embodiment) of the present disclosure will be described.

FIGS. 17A to 17E are process views for explaining a method of manufacturing the touch panel of the display device according to still another example embodiment (the sixth example embodiment) of the present disclosure.

Figure 17A:
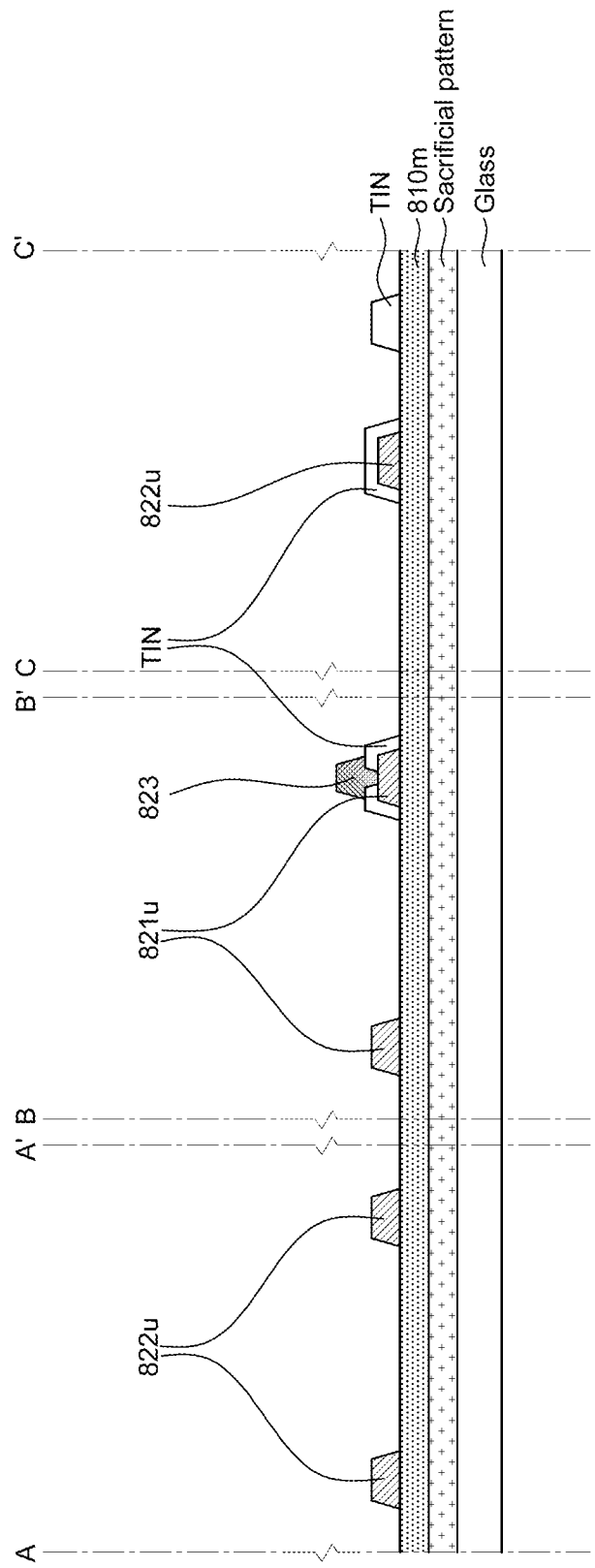
FIGS. 17A to 17E are process views for explaining a method of manufacturing a touch panel of a display device according to still another example embodiment (the sixth example embodiment) of the present disclosure.

Referring to FIG. 17A, a sacrificial pattern and a pattern material layer 810m are formed on a glass substrate. The pattern material layer 810m may be etched in a subsequent process to form the touch pattern layer 810.

In addition, the plurality of first unit electrodes 821u of the plurality of first touch electrodes 821 and the plurality of second unit electrodes 822u of the plurality of second touch electrodes 822 are formed on the pattern material layer 810m. A metal layer may be formed on the pattern material layer 810m, and the metal layer may be etched to form the plurality of first unit electrodes 821u and the plurality of second unit electrodes 822u together.

Next, the touch insulating layers TIN are formed on the plurality of first touch electrodes 821 and the plurality of second touch electrodes 822. The touch insulating layer TIN may be formed in at least an area where the bridge line 823 is to be formed. A contact hole may be formed in the touch insulating layer TIN that is formed to cover the first unit electrode 821u connected to the bridge line 823 among the touch insulating layers TIN. In addition, the touch insulating layers TIN may be formed to cover the plurality of second unit electrodes 822u crossing the bridge lines 823.

Figure 17B:
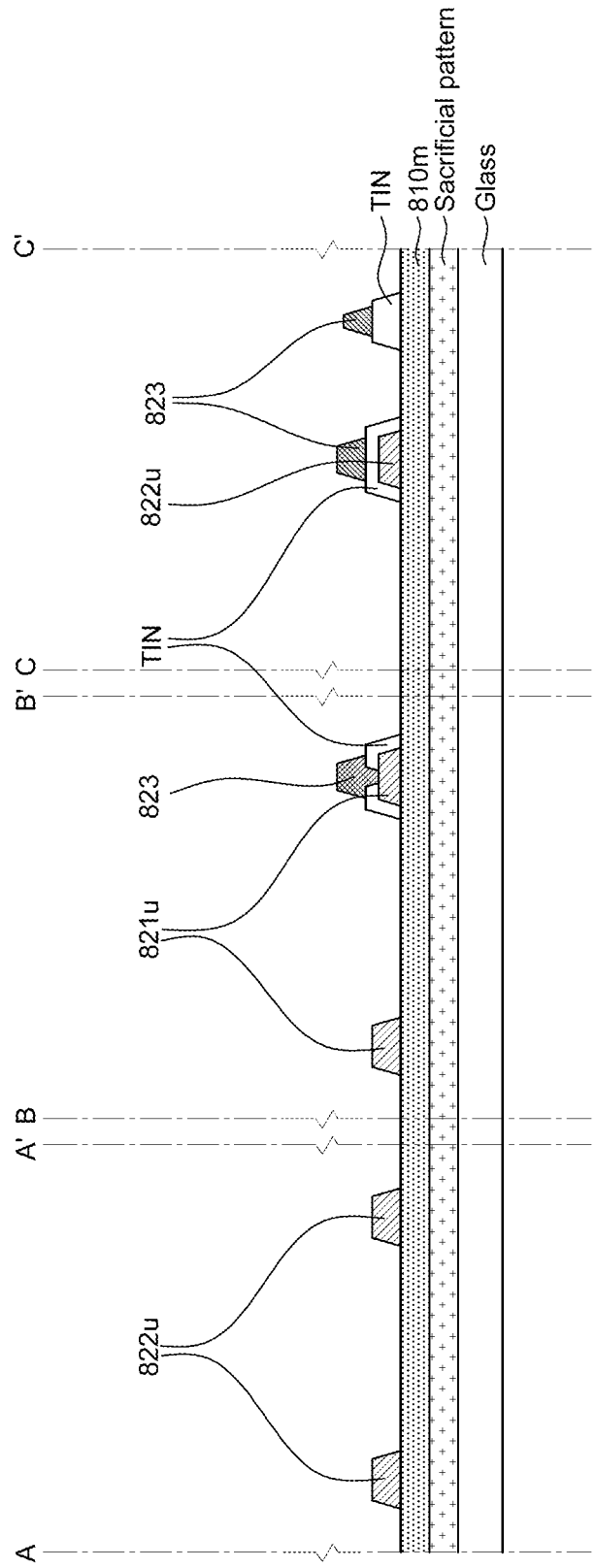

Subsequently, referring to FIG. 17B, the bridge lines 823 are formed on the touch insulating layers TIN. The bridge line 823 may be electrically connected to the first unit electrode 821u through a contact hole formed in the touch insulating layer TIN. In addition, the bridge line 823 may be insulated from the second unit electrode 823u by the touch insulating layer TIN.

Figure 17C:
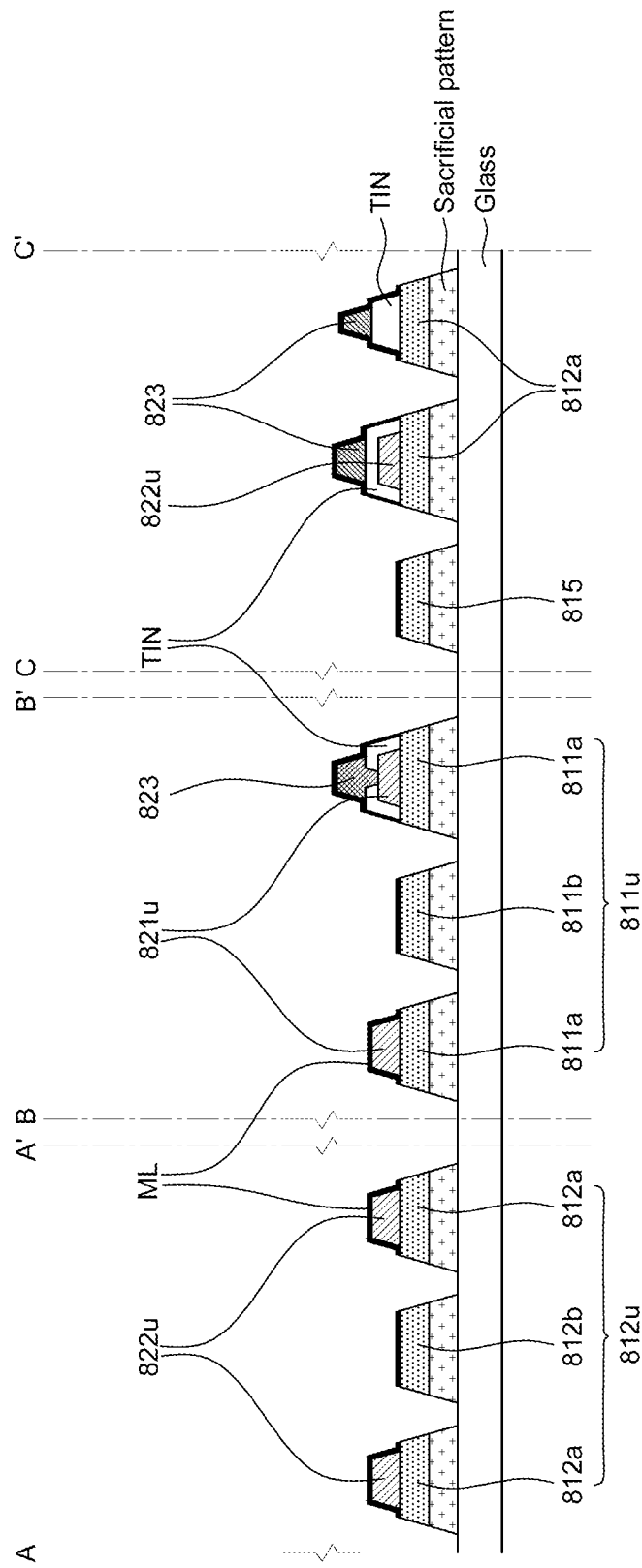

Subsequently, referring to FIG. 17C, a masking layer ML is formed on the touch electrode layer 820 including the first touch electrode 821, the second touch electrode 822, and the bridge line 823, and the pattern material layer 810m is etched using the masking layer ML. For example, the touch pattern layer 810 may be formed by etching a portion of the pattern material layer 810m in which the masking layer ML is not formed through a dry etching process. The masking layer ML may be formed of an oxide layer such as indium tin oxide (ITO), but is not limited thereto.

Figure 17D:
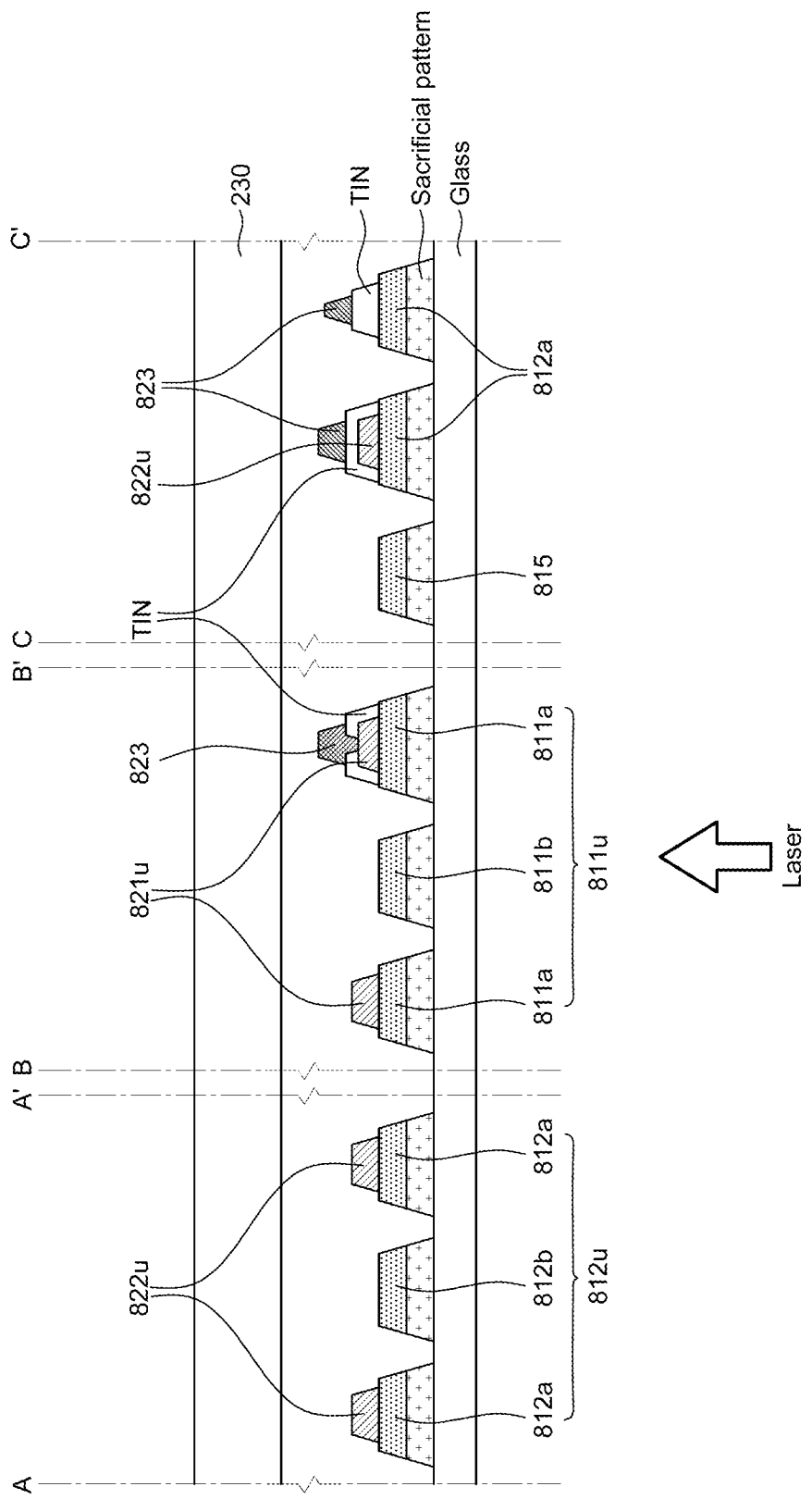

Subsequently, referring to FIG. 17D, the masking layer ML is removed, and the second filling layer 240 and the touch substrate 230 are formed on the touch pattern layer 810 and the touch electrode layer 820. The second filling layer 240 may come into contact with the touch pattern layer 810, the touch electrode layer 820, the sacrificial pattern, and the glass substrate, and the touch substrate 230 may cover the entire surface of the second filling layer 240.

Figure 17E:
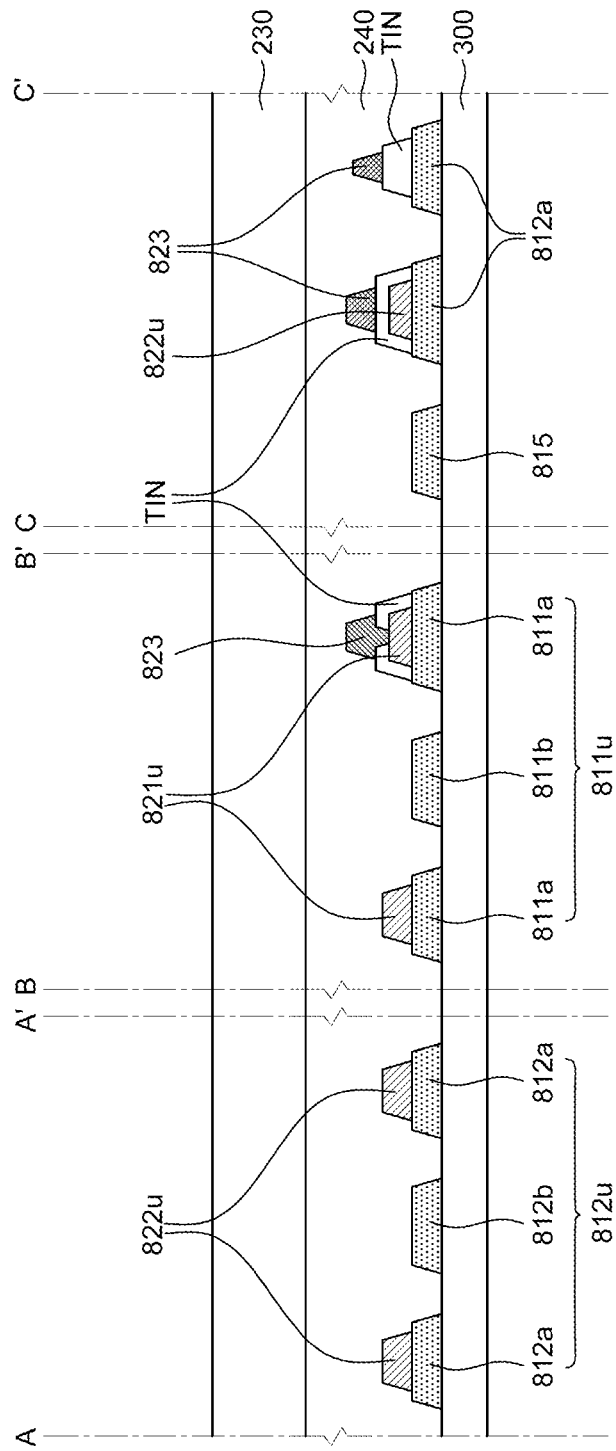

Finally, referring to FIG. 17E, a laser lift off (LLO) process of separating the glass substrate and the sacrificial pattern by irradiating a laser onto a lower portion of the glass substrate is performed. The touch pattern layer 810 and the touch electrode layer 820 separated from the glass substrate may be attached to the display panel to thereby form a display device.

At this time, the second sub-unit pattern 811$b$, the fourth sub-unit pattern 812$b$, the first connection pattern 813, and the island pattern 815 and the like are disposed between the glass substrate and the second filling layer 240, so that the contact area between the glass substrate and the second filling layer 240 may be reduced. Accordingly, an area in which the second filling layer 240 and the glass substrate contact may be reduced, and laser lift off (LLO) process efficiency for the touch panel may be increased.

In the touch panel of the display device according to still another example embodiment (the sixth example embodiment) of the present disclosure, the first touch electrode 821 and the second touch electrode 822 may be formed on the same layer. To electrically connect the first touch electrodes 821 adjacent to each other in the first direction X, the bridge lines 823 that are disposed across the second touch electrodes 822 may be formed on the first touch electrodes 821 and the second touch electrodes 822. In this case, the touch insulating layer TIN is formed in an area where the second touch electrode 822 and the bridge line 823 cross each other, so that the second touch electrode 822, and the bridge line 823 and the first touch electrode 821 may be insulated from each other. Accordingly, a touch input may be sensed by applying different signals to each of the plurality of first touch electrodes 821 and the plurality of second touch electrodes 822.

The example embodiments of the present disclosure can also be described as follows:

A display device according to an example embodiment of the present disclosure includes a touch pattern layer having a plurality of stretching patterns; and a touch electrode layer disposed on the touch pattern layer and having a plurality of touch electrodes, wherein each of the plurality of stretching patterns includes a plurality of unit patterns, wherein each of the plurality of touch electrodes includes a plurality of unit electrodes, wherein each of the plurality of unit patterns includes a first sub-unit pattern overlapping each of the plurality of unit electrode electrodes, and a second sub-unit pattern disposed inside the first sub-unit. Accordingly, laser lift off (LLO) process efficiency for the touch panel can be increased.

Each of the plurality of unit electrodes has a hexagonal and shape, wherein the first sub-unit pattern has a hexagonal shape.

The second sub-unit pattern has a mesh shape.

The second sub-unit pattern has a hexagonal shape smaller than that of the first sub-unit pattern.

Each of the plurality of unit patterns further includes a sub-connection pattern connecting the first sub-unit pattern and the second sub-unit pattern.

Each of the plurality of unit patterns further includes a third sub-unit pattern disposed inside the second sub-unit.

The third sub-unit pattern has a hexagonal shape smaller than that of the second sub-unit pattern.

Each of the plurality of unit patterns further includes a sub-connection pattern connecting the first sub-unit pattern, the second sub-unit pattern, and the third sub-unit pattern.

Each of the plurality of unit patterns has a hexagonal mesh shape.

The plurality of touch electrodes include a plurality of first touch electrodes extending in a first direction; and a plurality of second touch electrodes extending in a second direction.

The touch electrode layer further includes bridge lines connecting the plurality of first touch electrodes.

The touch panel further includes touch insulating layers disposed between the bridge lines and the plurality of second touch electrodes.

The plurality of first touch electrodes are disposed on the same layer as the bridge lines, and at least a portion of the plurality of second touch electrodes is disposed on the touch insulating layer to cross the bridge line.

The plurality of first touch electrodes are disposed on the same layer as the plurality of second touch electrodes, and the bridge lines are disposed on the touch insulating layers to cross the plurality of second touch electrodes.

The plurality of stretching patterns include, a plurality of first stretching patterns overlapping the plurality of first touch electrodes; and a plurality of second stretching patterns overlapping the plurality of second touch electrodes.

The touch pattern layer includes, a first connection pattern connecting the plurality of stretching patterns disposed in a first direction; and a second connection pattern connecting the plurality of stretching patterns disposed in a second direction.

A display device according to another example embodiment of the present disclosure comprising a stretchable display panel and a stretchable touch panel, the touch panel includes a touch pattern layer having a plurality of stretching patterns; and a touch electrode layer disposed on the touch pattern layer and having a plurality of touch electrodes, wherein each of the plurality of stretching patterns includes a plurality of unit patterns, wherein each of the plurality of touch electrodes includes a plurality of unit electrodes, wherein each of the plurality of unit patterns includes a first sub-unit pattern overlapping each of the plurality of unit electrode electrodes, and a second sub-unit pattern disposed inside the first sub-unit.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on all the technical concepts that falls within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch panel, comprising:
a touch pattern layer having a plurality of stretching patterns; and
a touch electrode layer disposed on the touch pattern layer and having a plurality of touch electrodes,
wherein each of the plurality of stretching patterns includes a plurality of unit patterns,
wherein each of the plurality of touch electrodes includes a plurality of unit electrodes,
wherein each of the plurality of unit patterns includes a first sub-unit pattern overlapping each of the plurality of unit electrodes, and a second sub-unit pattern disposed inside the first sub-unit pattern, and
wherein the first sub-unit pattern and the second sub-unit pattern are on a same layer, and
wherein the second sub-unit pattern does not overlap with each of the plurality of unit electrodes from a plan view.

2. The touch panel of claim 1,
wherein each of the plurality of unit electrodes has a hexagonal shape,
wherein the first sub-unit pattern has a hexagonal shape.

3. The touch panel of claim 2, wherein the second sub-unit pattern has a mesh shape.

4. The touch panel of claim 2, wherein the second sub-unit pattern has a hexagonal shape smaller than that of the first sub-unit pattern.

5. The touch panel of claim 4, wherein each of the plurality of unit patterns further includes a sub-connection pattern coupling the first sub-unit pattern and the second sub-unit pattern.

6. The touch panel of claim 4, wherein each of the plurality of unit patterns further includes a third sub-unit pattern disposed inside the second sub-unit.

7. The touch panel of claim 6, wherein the third sub-unit pattern has a hexagonal shape smaller than that of the second sub-unit pattern.

8. The touch panel of claim 6, wherein each of the plurality of unit patterns further includes a sub-connection pattern coupling the first sub-unit pattern, the second sub-unit pattern, and the third sub-unit pattern.

9. The touch panel of claim 1, wherein each of the plurality of unit patterns has a hexagonal mesh shape.

10. The touch panel of claim 1,
wherein the plurality of touch electrodes include,
a plurality of first touch electrodes extending in a first direction; and
a plurality of second touch electrodes extending in a second direction.

11. The touch panel of claim 10, wherein the touch electrode layer further includes bridge lines coupling the plurality of first touch electrodes.

12. The touch panel of claim 11, further comprising:
touch insulating layers disposed between the bridge lines and the plurality of second touch electrodes.

13. The touch panel of claim 12,
wherein the plurality of first touch electrodes are disposed on the same layer as the bridge lines, and
wherein at least a portion of the plurality of second touch electrodes is disposed on the touch insulating layer to cross the bridge line.

14. The touch panel of claim 12,
wherein the plurality of first touch electrodes are disposed on the same layer as the plurality of second touch electrodes, and
wherein the bridge lines are disposed on the touch insulating layers to cross the plurality of second touch electrodes.

15. The touch panel of claim 10,
wherein the plurality of stretching patterns include:
a plurality of first stretching patterns overlapping the plurality of first touch electrodes; and
a plurality of second stretching patterns overlapping the plurality of second touch electrodes.

16. The touch panel of claim 1,
wherein the touch pattern layer includes:
a first connection pattern coupling the plurality of stretching patterns disposed in a first direction; and
a second connection pattern coupling the plurality of stretching patterns disposed in a second direction.

17. A display device comprising:
a stretchable display panel; and
a stretchable touch panel, the touch panel including:
a touch pattern layer having a plurality of stretching patterns; and
a touch electrode layer disposed on the touch pattern layer and having a plurality of touch electrodes,
wherein each of the plurality of stretching patterns includes a plurality of unit patterns,
wherein each of the plurality of touch electrodes includes a plurality of unit electrodes,
wherein each of the plurality of unit patterns includes a first sub-unit pattern overlapping each of the plurality of unit electrodes, and a second sub-unit pattern disposed inside the first sub-unit pattern,
wherein the first sub-unit pattern and the second sub-unit pattern are disposed on a same layer, and
wherein the second sub-unit pattern does not overlap with each of the plurality of unit electrodes from a plan view.

18. A display device comprising:
a stretchable touch panel, the touch panel including:
a plurality of stretchable pattern structures spaced apart from each other, adjacent stretchable pattern structures coupled to a stretchable connection pattern, each stretchable pattern structure of the plurality of stretchable pattern structures including a unit pattern structure, the unit pattern structure including a first sub-unit pattern having a first shape and a second sub-unit pattern having a second shape;
a plurality of touch electrodes adjacent to the plurality of stretchable pattern structures, each touch electrode of the plurality of touch electrodes including a unit electrode; and
a first sub-connection pattern between the first sub-unit pattern and the second sub-unit pattern, the first sub-connection pattern disposed on a same layer as the first sub-unit pattern and the second sub-unit pattern,
wherein the unit electrode overlaps with the first sub-unit pattern and does not overlap with the second sub-unit pattern.

19. The display device of claim 18, wherein the first shape includes a polygonal shape and the second shape includes a mesh shape.

20. The display device of claim 18, wherein the first sub-connection pattern does not overlap with the unit electrode.

21. A display device comprising:
a stretchable touch panel, the touch panel including:
a plurality of stretchable pattern structures spaced apart from each other, adjacent stretchable pattern structures coupled to a stretchable connection pattern, each stretchable pattern structure of the plurality of stretchable pattern structures including a unit pattern structure, the unit pattern structure including a first sub-unit pattern having a first shape and a second sub-unit pattern having a second shape;
a plurality of touch electrodes adjacent to the plurality of stretchable pattern structures, each touch electrode of the plurality of touch electrodes including a unit electrode; and
a second sub-connection pattern between the first sub-unit pattern and the second sub-unit pattern,
wherein the unit electrode overlaps with the first sub-unit pattern and does not overlap with the second sub-unit pattern,
wherein the unit pattern structure includes a third sub-unit pattern between the second sub-connection pattern and the second sub-unit pattern, and
wherein the second sub-connection pattern disposed on a same layer as the first, second, and third sub-unit patterns.

22. The display device of claim 21, wherein the second sub-connection pattern does not overlap with the unit electrode.

\* \* \* \* \*